(12) United States Patent
Diancin et al.

(10) Patent No.: US 10,116,523 B1
(45) Date of Patent: Oct. 30, 2018

(54) PREDICTIVE CONNECTIVITY DIAGNOSTICS FOR A WIRELESS MESH NETWORK IN A PROCESS CONTROL SYSTEM

(71) Applicant: FISHER-ROSEMOUNT SYSTEMS, INC., Round Rock, TX (US)

(72) Inventors: Wynn Gervacio Diancin, Bataan (PH); Nicholas T. Meyer, Crystal, MN (US); Wendy Geneva Santos Leonor, Valenzuela (PH); Patrick Pererras Natividad, Rizal (PH)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 15 days.

(21) Appl. No.: 15/485,752

(22) Filed: Apr. 12, 2017

(51) Int. Cl.
*H04L 12/24* (2006.01)
*H04W 24/04* (2009.01)
*H04W 88/16* (2009.01)
*H04W 84/18* (2009.01)

(52) U.S. Cl.
CPC ........... *H04L 41/147* (2013.01); *H04W 24/04* (2013.01); *H04W 84/18* (2013.01); *H04W 88/16* (2013.01)

(58) Field of Classification Search
None
See application file for complete search history.

(56) References Cited

U.S. PATENT DOCUMENTS

| 8,103,316 B2* | 1/2012 | Chakraborty | G05B 19/4185 455/572 |
| 8,681,639 B2* | 3/2014 | Cao | G06Q 10/06 370/242 |
| 2009/0117949 A1 | 5/2009 | Allen, Jr. et al. | |
| 2011/0164512 A1 | 7/2011 | Citrano, III et al. | |
| 2015/0333953 A1* | 11/2015 | Vasseur | H04L 41/0668 370/228 |

FOREIGN PATENT DOCUMENTS

CA  2 733 268 A1  4/2010

* cited by examiner

*Primary Examiner* — Hong Cho
(74) *Attorney, Agent, or Firm* — Marshall, Gerstein & Borun LLP

(57) ABSTRACT

Predictive wireless connectivity diagnostics for a wireless mesh network in a process control system includes generating predicted pinch points and potential pinch points in response to a connectivity condition. The connectivity condition is an anticipated failure of a communication ability within the wireless mesh network. The predicted pinch points are generated as a function of the failure of the communication ability and communication paths within the wireless mesh network. The potential pinch points are generated as a function of the failure of the communication ability and the number of neighbors in direct wireless communication for each wireless node. The potential pinch point is a wireless node that has less than a threshold number of neighboring wireless communication devices in direct wireless communication with the wireless node.

41 Claims, 12 Drawing Sheets

Mesh Network Topology

GTWY: WD1, WD2, WD3, WD4, WD5
WD1: GTWY, WD2, WD4
WD2: GTWY, WD1, WD3, WD10, WD11
WD3: GTWY, WD2, WD5, WD6, WD7, WD10
WD4: GTWY, WD1, WD5
WD5: GTWY, WD3, WD4, WD6
WD6: WD3, WD5, WD7, WD8, WD9
WD7: WD3, WD6, WD8, WD9, WD12
WD8: WD6, WD7, WD9
WD9: WD6, WD7, WD9
WD10: WD2, WD3, WD7, WD11, WD12
WD11: WD2, WD10, WD12
WD12: WD3, WD7, WD10, WD11

FIG. 4

Mesh Network Topology

GTWY: WD1, WD2, WD4, WD5
WD1: GTWY, WD2, WD4
WD2: GTWY, WD1, WD10, WD11
WD3: GTWY, WD2, WD5, WD6, WD7, WD10
WD4: GTWY, WD1, WD5
WD5: GTWY, WD4
WD6: WD7, WD8, WD9
WD7: WD6, WD8, WD9, WD12
WD8: WD6, WD7, WD9
WD9: WD6, WD7, WD9
WD10: WD2, WD7, WD11, WD12
WD11: WD2, WD10, WD12
WD12: WD7, WD10, WD11

FIG. 13

PREDICTIVE CONNECTIVITY DIAGNOSTICS FOR A WIRELESS MESH NETWORK IN A PROCESS CONTROL SYSTEM

TECHNICAL FIELD

The present disclosure relates generally to process control systems, and, more particularly, to predictive diagnostics to identify potential connectivity issues in mesh networks in process control systems.

BACKGROUND

Process control systems are widely used in factories and/or plants in which products are manufactured or processes are controlled (e.g., chemical manufacturing, power plant control, etc.). Process control systems are also used in the harvesting of natural resources such as, for example, oil and gas drilling and handling processes, etc. In fact, virtually any manufacturing process, resource harvesting process, etc. can be automated through the application of one or more process control systems. It is believed the process control systems will eventually be used more extensively in agriculture as well.

Distributed process control systems, like those used in chemical, petroleum or other processes, typically include one or more centralized or decentralized process controllers communicatively coupled to at least one host or operator workstation and to one or more process control and instrumentation devices, such as field devices, via analog, digital or combined analog/digital buses or via a wireless communication link or network. A process controller (sometimes referred to as a "controller"), which is typically located within the plant or other industrial environment, receives signals (sometimes referred to as "control inputs") indicative of process measurements and uses the information carried by these signals to implement control routines that cause the controller to generate control signals (sometimes referred to as "control outputs") based on the control inputs and the internal logic of the control routines. The controllers send the generated control signals over buses or other communication links to control operation of field devices. In some instances, the controllers may coordinate with control routines implemented by smart field devices, such as Highway Addressable Remote Transmitter (HART®), WirelessHART®, and FOUNDATION® Fieldbus (sometimes just called "Fieldbus") field devices. Moreover, in many cases, there may be plant or other industrial equipment that operates in the plant or other industrial setting to perform some function that is not under direct control of the process controller, such as vibration detection equipment, rotating equipment, electrical power generating equipment, etc.

Field devices that are typically associated with the controller, which may be, for example valves, valve positioners, switches, transmitters, and sensors (e.g., temperature, pressure and flow rate sensors), are located within the process environment and generally perform physical or process control functions. For example, a valve may open or close in response to a control output received from a controller, or may transmit to a controller a measurement of a process parameter so that the controller can utilize the measurement as a control input. Smart field devices, such as field devices conforming to the well-known Fieldbus protocol may also perform control calculations, alarming functions, and other control functions commonly implemented within a controller. Field devices may be configured to communicate with controllers and/or other field devices according to various communication protocols. For example, a plant may include traditional analog 4-20 mA field devices, HART® field devices, Fieldbus field devices, and/or other types of field devices.

The process controllers receive signals indicative of process measurements or process variables made by or associated with the field devices and/or other information pertaining to the field devices, and execute a controller application that runs, for example, different control modules that make process control decisions, generate control signals based on the received information, and coordinate with the control modules or blocks being performed in the field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers, or computing devices, data historians, report generators, centralized databases, or other centralized administrative computing devices that are typically, but not always, placed in control rooms or other locations away from the harsher plant environment. Each of these hardware devices typically, though not always, is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers, and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more operator workstations or computing devices, enables users to create or change process control modules and download these process control modules via a data highway to dedicated distributed controllers. Typically, these control modules are made up of communicatively interconnected function blocks, which perform functions within the control scheme based on inputs thereto and which provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the operator interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

As noted above, operator display applications are typically implemented on a system wide basis in one or more of the workstations and provide displays to the operator or maintenance persons regarding the operating state of the control system or the devices within the plant. Typically, these displays take the form of alarming displays that receive alarms generated by controllers or devices within the process plant, control displays indicating the operating state of the controllers and other devices within the process plant, maintenance displays indicating the operating state of the devices within the process plant, etc. These displays are generally configured to display, in known manners, information or data received from the process control modules or the devices within the process plant. In some known systems, displays have a graphic associated with a physical or logical element that is communicatively tied to the physical or logical element to receive data about the physical or logical element. The graphic may be changed on the display screen based on the received data to illustrate, for example, that a tank is half full, to illustrate the flow measured by a flow sensor, etc.

Traditional analog 4-20 mA field devices communicate with a controller via a two-wire communication link (sometimes called a "loop" or "current loop") configured to carry a 4-20 mA DC signal indicative of a measurement or control command. For example, a level transmitter may sense a tank level and transmit via the loop a current signal corresponding to that measurement (e.g., a 4 mA signal for 0% full, a 12 mA signal for 50% full, and a 20 mA signal for 100% full). The controller receives the current signal, determines the tank level measurement based on the current signal, and takes some action based on the tank level measurement (e.g., opening or closing an inlet valve). Analog 4-20 mA field devices typically come in two varieties including four-wire field devices and two-wire field devices. A four-wire field device typically relies on a first set of wires (i.e., the loop) for communication, and a second set of wires for power. A two-wire field device relies on the loop for both communication and power. These two-wire field devices may be called "loop powered" field devices.

Process plants often implement traditional 4-20 mA systems due to the simplicity and effectiveness of the design. Unfortunately, traditional 4-20 mA current loops only transmit one process signal at a time. Thus, a set-up including a control valve and a flow transmitter on a pipe carrying material may require three separate current loops: one for carrying a 4-20 mA signal indicative of a control command for the valve (e.g., to move the valve to 60% open); a second for carrying a 4-20 mA signal indicative of the valve's actual position (e.g., so that the controller knows the degree to which the valve has responded to control commands); and a third for carrying a 4-20 mA signal indicative of a measured flow. As a result, a traditional 4-20 mA set-up in a plant having a large number of field devices may require extensive wiring, which can be costly and can lead to complexity when setting up and maintaining the communication system.

More recently, the process control industry has moved to implement digital communications within the process control environment. For example, the HART® protocol uses the loop DC magnitude to send and receive analog signals, but also superimposes an AC digital carrier signal on the DC signal to enable two-way field communications with smart field instruments. As another example, the Fieldbus protocol provides all-digital communications on a two-wire bus (sometimes called a "segment" or "Fieldbus segment"). This two-wire Fieldbus segment can be coupled to multiple field devices to provide power to the multiple field devices (via a DC voltage available on the segment) and to enable communication by the field devices (via an AC digital communication signal superimposed on the DC power supply voltage). Generally speaking, because the connected field devices use the same segment for communication and are connected in parallel, only one field device can transmit a message at any given time over the segment. Accordingly, communication on a segment is coordinated by a device designated as a link active scheduler (LAS). The LAS is responsible for passing a token between field devices connected to the segment. Only the device with the token may communicate over the segment at a particular time.

These digital communication protocols generally enable more field devices to be connected to a particular communication link, support more and faster communications between the field devices and the controller, and/or allow field devices to send more and different types of information (such as information pertaining to the status and configuration of the field device itself) to the process controller and other devices in or connected to the control network. Furthermore, these standard digital protocols enable field devices made by different manufacturers to be used together within the same process control network.

The various devices within the process plant may be interconnected in physical and/or logical groups to create a logical process, such as a control loop. Likewise, a control loop may be interconnected with other control loops and/or devices to create sub-units. A sub-unit may be interconnected with other sub-units to create a unit, which in turn, may be interconnected with other units to create an area. Process plants generally include interconnected areas, and business entities generally include process plants which may be interconnected. As a result, a process plant includes numerous levels of hierarchy having interconnected assets, and a business enterprise may include interconnected process plants. In other words, assets related to a process plant, or process plants themselves, may be grouped together to form assets at higher levels.

Thus, one particularly important aspect of process control system design involves the manner in which field devices are communicatively coupled to each other, to controllers and to other systems or devices within a process control system or a process plant. In general, the various communication channels, links and paths that enable the field devices to function within the process control system are commonly collectively referred to as an input/output (I/O) communication network.

The communication network topology and physical connections or paths used to implement an I/O communication network can have a substantial impact on the robustness or integrity of field device communications, particularly when the I/O communications network is subjected to environmental factors or conditions associated with the process control system. For example, many industrial control applications subject field devices and their associated I/O communication networks to harsh physical environments (e.g., high, low or highly variable ambient temperatures, vibrations, corrosive gases or liquids, etc.), difficult electrical environments (e.g., high noise environments, poor power quality, transient voltages, etc.), etc. In any case, environmental factors can compromise the integrity of communications between one or more field devices, controllers, etc. In some cases, such compromised communications could prevent the process control system from carrying out its control routines in an effective or proper manner, which could result in reduced process control system efficiency and/or profitability, excessive wear or damage to equipment, dangerous conditions that could damage or destroy equipment, building structures, the environment and/or people, etc.

In order to minimize the effect of environmental factors and to assure a consistent communication path, I/O communication networks used in process control systems have historically been hardwired networks, with the wires being encased in environmentally protected materials such as insulation, shielding and conduit. Also, the field devices within these process control systems have typically been communicatively coupled to controllers, workstations, and other process control system components using a hardwired hierarchical topology in which non-smart field devices are directly coupled to controllers using analog interfaces such as, for example, 4-20 mA, 0-10 VDC, etc. hardwired interfaces or I/O boards. Smart field devices, such as Fieldbus devices, are also coupled via hardwired digital data busses, which are coupled to controllers via smart field device interfaces.

While hardwired I/O communication networks can initially provide a robust I/O communication network, their robustness can be seriously degraded over time as a result of environmental stresses (e.g., corrosive gases or liquids, vibration, humidity, etc.). For example, contact resistances associated with the I/O communication network wiring may increase substantially due to corrosion, oxidation and the like. In addition, wiring insulation and/or shielding may degrade or fail, thereby creating a condition under which environmental electrical interference or noise can more easily corrupt the signals transmitted via the I/O communication network wires. In some cases, failed insulation may result in a short circuit condition that results in a complete failure of the associated I/O communication wires.

Additionally, hardwired I/O communication networks are typically expensive to install, particularly in cases where the I/O communication network is associated with a large industrial plant or facility that is distributed over a relatively large geographic area, for example, an oil refinery or chemical plant that consumes several acres of land. In many instances, the wiring associated with the I/O communication network must span long distances and/or go through, under or around many structures (e.g., walls, buildings, equipment, etc.) Such long wiring runs typically involve substantial amounts of labor, material and expense. Further, such long wiring runs are especially susceptible to signal degradation due to wiring impedances and coupled electrical interference, both of which can result in unreliable communications.

Moreover, such hardwired I/O communication networks are generally difficult to reconfigure when modifications or updates are needed. Adding a new field device typically requires the installation of wires between the new field device and a controller. Retrofitting a process plant in this manner may be very difficult and expensive due to the long wiring runs and space constraints that are often found in older process control plants and/or systems. High wire counts within conduits, equipment and/or structures interposing along available wiring paths, etc., may significantly increase the difficulty associated with retrofitting or adding field devices to an existing system. Exchanging an existing field device with a new device having different field wiring requirements may present the same difficulties in the case where more and/or different wires have to be installed to accommodate the new device. Such modifications may often result in significant plant downtime.

Wireless I/O communication networks have been used to alleviate some of the difficulties associated with hardwired I/O networks, and to alleviate the costs involved in deploying sensors and actuators within the process control system. Wireless I/O communication networks have also been suggested for process control systems and portions thereof that are relatively inaccessible or inhospitable for hardwired I/O communication networks. For example, Shepard et al., U.S. Pat. No. 7,436,797 entitled "Wireless Architecture And Support For Process Control Systems" and patented Oct. 14, 2008, the content of which is expressly incorporated by reference herein, discloses that relatively inexpensive wireless mesh networks may be deployed within a process control system, either alone or in combination with point-to-point communications, to produce a robust wireless communication network that can be easily set up, configured, changed and monitored, to thereby make the wireless communication network more robust, less expensive and more reliable.

Wireless mesh communication networks (or mesh networking topology) utilize multiple nodes, each of which may serve not only as a client to receive and send its own data, but also as a repeater or relay to propagate data through the network to other nodes. Each node is connected to another neighboring node, and preferably to multiple neighboring nodes, each of which may be connected to additional neighboring nodes. The result is a network of nodes that provides multiple paths of communication from one node to another through the network, thereby creating a relatively inexpensive, robust network that allows for continuous connections and reconfigurations even when communication paths are broken or blocked.

In a wireless mesh network, each device (node) may connect to a gateway via direct wireless connection or indirectly via a connection through a neighboring device. Each device has a signal strength that generally correlates to the physical proximity of the device to the wireless gateway or to a neighboring device. In cases where no direct connection to the wireless gateway is available, each device connects to the gateway through another peer device that has a connection to the gateway or to another device. The number of relay nodes used to chain together a connection of another node to the gateway is known as the number of hops in a connection path. Each device uses the connection path, and the order in which the device-to-device connections are established is known as the communication route.

One such wireless mesh network used in process control is the WirelessHART® mesh network (such as the WirelessHART® mesh network described by the international standard IEC 62591) developed by the HART Communication Foundation. Generally speaking, a WirelessHART® mesh network is a multi-hop communication network having a gateway and multiple WirelessHART® devices (wireless nodes). The network is organized in a mesh topology and each device is capable of routing messages for other devices in order to relay data to and from the gateway.

WirelessHART® devices are capable of self-diagnostics and generate their own alerts and wireless communication statistics. Additional diagnostics also exist to identify when a wireless node is a pinch point. A pinch point is a wireless node whose failure would result in at least one other wireless node no longer having a communication path to the gateway of the wireless mesh network. Given a wireless mesh network, data about the WirelessHART® devices and communication connectivity conditions, such as battery condition, poor communications (e.g., low communication path stability) and pinch point devices may be collected and analyzed. However, although such diagnostics provide information on the existing connectivity conditions of the devices and the network, there is a lack of diagnostics on the potential impact a connectivity condition may have on the rest of the wireless mesh communication network.

SUMMARY

Connectivity conditions within a wireless mesh network, such as identified pinch points, low battery condition and low communication path stability, trigger predictive analyses for the rest of the wireless mesh network. A connectivity condition is an anticipated failure of a communication ability within the wireless mesh network. For example, failure of a wireless node identified as a pinch point device may cause other wireless nodes within the network to lose communication with the gateway of the wireless mesh network. Similarly, battery failure of a wireless node may create pinch points out of other wireless nodes in the wireless mesh network. Such connectivity condition may also lead to failures that cause a wireless node to have less than an optimal number of neighboring wireless communication devices (i.e., the gateway and/or other wireless nodes in direct communication), such that it requires additional neighbors. The predictive analyses generate predicted pinch points and potential pinch points as a function of the failure of the communication ability. That is, the wireless mesh network is analyzed as if the communication ability has failed in order to identify wireless nodes that will become pinch points as a result of the communication failure or that may become potential pinch points due to having fewer than an optimal number of neighboring wireless communication devices in direct wireless communication. In this manner, a predicted state of the wireless mesh network may be identified.

BRIEF DESCRIPTION OF THE DRAWINGS

FIG. 4 is a chart illustrating the topology of the wireless mesh network of FIG. 3 in tabular form in accordance with this disclosure;

FIG. 13 is a chart illustrating the topology of the wireless mesh network of FIG. 12 in tabular form in accordance with this disclosure.

DETAILED DESCRIPTION

Figure 1:
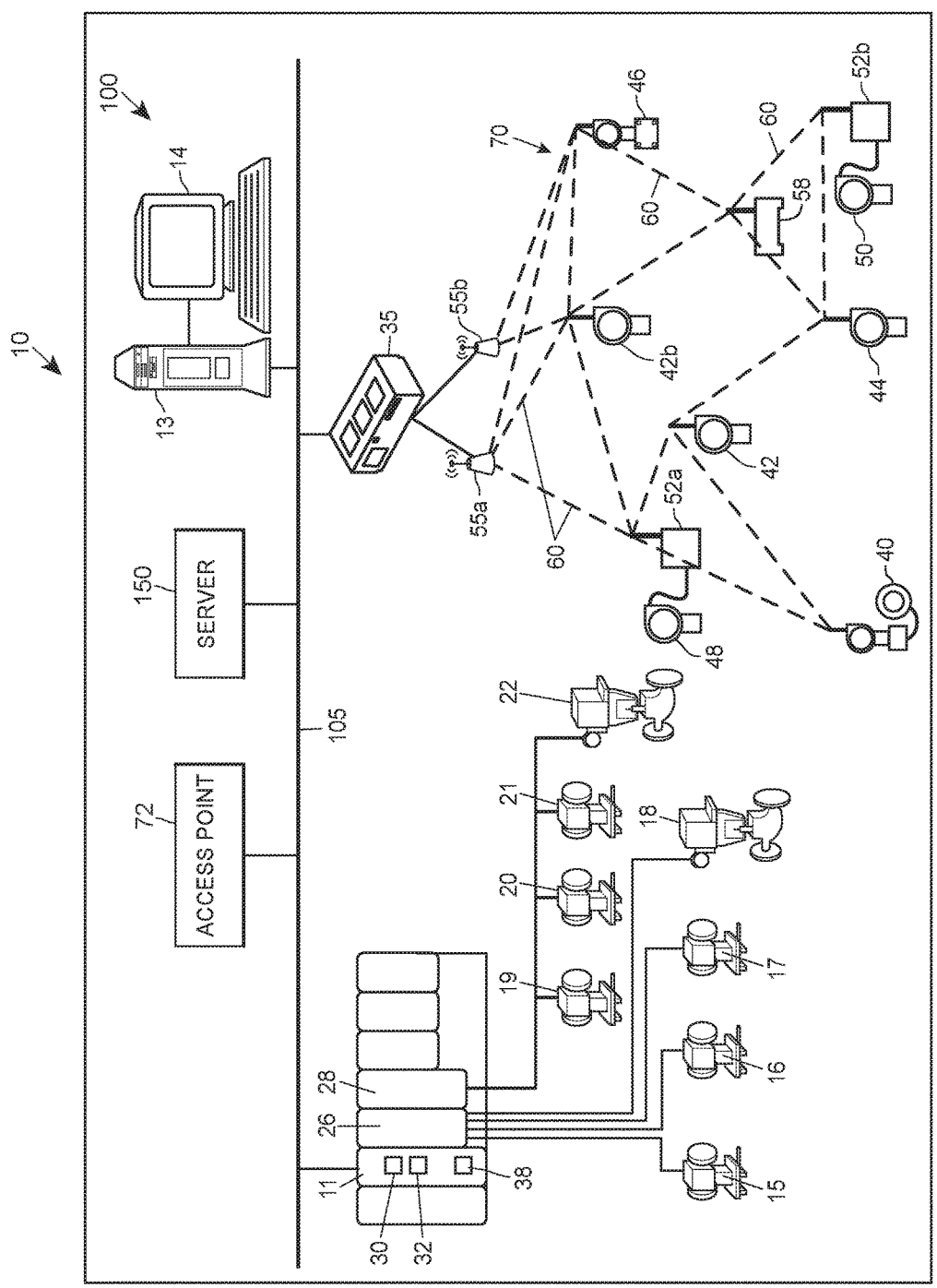
FIG. 1 is a combined block and schematic diagram of a distributed control system in accordance with this disclosure in accordance with this disclosure.

FIG. 1 is a block and schematic diagram of an exemplary process control network 100 operating in a process control system, process plant or other industrial setting 10. The process control network 100 may include a network backbone 105 providing connectivity directly or indirectly between a variety of other devices. The network backbone 105 may include both wireless and/or wired communication channels, also referred to as communication paths or communication links. The devices coupled to the network backbone 105 include, in various embodiments, combinations of access points 72, which may be handheld or other portable computing devices, such as a laptop computer, a tablet, a hand-held smart device, a portable testing device (PTD), etc., and host computers 13, such as a personal computer, workstation, etc. each having a display screen 14 as well as various other input/output devices (not shown), servers 150, etc.

As illustrated in FIG. 1, the controller 11 is connected to the field devices 15-22 via input/output (I/O) cards 26 and 28 which may implement any desired process control communication protocol, such as one or more of the HART, Fieldbus, CAN, Profibus, etc., protocols. The controller 11 is, in FIG. 1, communicatively connected to the field devices 15-22 to perform control of the field devices 15-22 and therefore control of the plant. Generally, the field devices 15-22 may be any types of devices, such as sensors, valves, transmitters, positioners, etc., while the I/O cards 26 and 28 may be any types of I/O devices conforming to any desired communication or controller protocol. For example, the field devices 15-22 and/or I/O cards 26 and 28 may be configured according to the HART protocol or to the Fieldbus protocol. The controller 11 includes a processor 30 that implements or oversees one or more process control routines 38 (or any module, block, or sub-routine thereof) stored in a memory 32. Generally speaking, the controller 11 communicates with the devices 15-22 and the host computers to control a process in any desired manner. Moreover, the controller 11 implements a control strategy or scheme using what are commonly referred to as function blocks (not shown), wherein each function block is an object or other part (e.g., a subroutine) of an overall control routine that operates in conjunction with other function blocks to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process control system 10. Of course, hybrid and other types of function blocks exist and may be utilized. The function blocks may be stored in and executed by the controller 11 or other devices.

As illustrated in FIG. 1, wireless gateways 35, and wireless communication networks 70 are likewise communicatively coupled to the network backbone 105. The wireless communication network 70 may include wireless devices (also referred to as wireless nodes) 40-58, which include wireless field devices 40-46, wireless adapters 52a and 52b, access points 55a and 55b, and a router 58. The wireless adapters 52a and 52b may be connected to non-wireless field devices 48 and 50, respectively. Though FIG. 1 depicts only a single one of some of the devices connected to the network backbone 105, it will be understood that each of the devices could have multiple instances on the network backbone 105 and, in fact, that the process plant 10 may include multiple network backbones 105. Similarly, the process control network 100 may include multiple gateways and wireless communication networks 70.

The controller 11 may be communicatively connected to wireless field devices 40-46 via the network backbone 105 and a wireless gateway 35. The controller 11 may operate to implement a batch process or a continuous process using at least some of the field devices 15-22 and 40-50. The controller 11, which may be, by way of example, the DeltaV™ controller sold by Emerson Process Management, is communicatively connected to the process control network backbone 105. The controller 11 may be also communicatively connected to the field devices 15-22 and 40-50 using any desired hardware and software associated with, for example, standard 4-20 mA devices, I/O cards 26, 28, and/or any smart communication protocol such as the FOUNDATION® Fieldbus protocol, the HART® protocol, the Wireless HART® protocol, etc. In the embodiment illustrated in FIG. 1, the controller 11, the field devices 15-22 and the I/O cards 26, 28 are wired devices, and the field devices 40-46 are wireless field devices.

The processor 30 of the controller 11 implements or oversees one or more process control routines (stored in the memory 32), which may include control loops. The processor 30 may communicate with the field devices 15-22 and 40-50 and with other nodes that are communicatively connected to the backbone 105. It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system may take any form, including software, firmware, hardware, etc. Control routines may be implemented in any desired software format, such as using object oriented programming, ladder logic, sequential function charts, function block diagrams, or using any other software programming language or design paradigm. In particular, the control routines may be implemented by a user through the host computer 14 or access points 72. The control routines may be stored in any desired type of memory, such as random access memory (RAM), or read only memory (ROM). Likewise, the control routines may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

Referring still to FIG. 1, the wireless field devices 40-46 communicate in a wireless communications network 70 using a wireless protocol, such as the WirelessHART® protocol. Such wireless field devices 40-46 may directly communicate with one or more other nodes of the process control network 100 that are also configured to communicate wirelessly (using the wireless protocol, for example). To communicate with one or more other nodes that are not configured to communicate wirelessly, the wireless field devices 40-46 may utilize a wireless gateway 35 connected to the backbone 105. Of course, the field devices 15-22 and 40-46 could conform to any other desired standard(s) or protocols, such as any wired or wireless protocols, including any standards or protocols developed in the future.

The wireless gateway 35 is an example of a provider device that may provide access to various wireless devices 40-58 of a wireless communications network 70. In particular, the wireless gateway 35 provides communicative coupling between the wireless devices 40-58 and other nodes of the process control network 100 (including the controller 11). The wireless gateway 35 provides communicative coupling, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks. In other cases, the wireless gateway 35 may translate commands between wired and wireless protocols that do not share any protocol layers.

Similar to the wired field devices 15-22, the wireless field devices 40-46 of the wireless communications network 70 may perform physical control functions within the process plant 10 (e.g., opening or closing valves or taking measurements of process parameters). The wireless field devices 40-46, however, are configured to communicate using the wireless communication protocol of the wireless communications network 70, whereas the wired field devices 15-22 are configured to communicate using a wired communication protocol (e.g., HART®, FOUNDATION® Fieldbus, etc.). As such, the wireless field devices 40-46, the wireless gateway, and other wireless nodes 52-58 of the wireless communications network 70 are producers and consumers of wireless communication packets, whereas the wired field devices 15-22 are producers and consumers of wired communication packets.

In some scenarios, the wireless communications network 70 may include non-wireless devices. For example, a field device 48 of FIG. 1A may be a legacy 4-20 mA device and a field device 50 may be a traditional wired HART device. To communicate within the network 70, the field devices 48 and 50 may be connected to the wireless communications network 70 via a wireless adaptor 52a or 52b. Additionally, the wireless adaptors 52a, 52b may support other communication protocols such as FOUNDATION® Fieldbus, PRO- FIBUS, DeviceNet, etc. Furthermore, the wireless communications network 70 may include one or more network access points 55a, 55b, which may be separate physical devices in wired communication with the wireless gateway 35 or may be provided with the wireless gateway 35 as an integral device. The wireless communications network 70 may also include one or more routers 58 to forward packets from one wireless device to another wireless device within the wireless communications network 70. The wireless devices 32-46 and 52-58 may communicate with each other and with the wireless gateway 35 over wireless links 60 of the wireless communications network 70.

In certain embodiments, the process control network 100 may include other nodes connected to the network backbone 105 that communicate using other wireless protocols. For example, the process control network 100 may include one or more wireless access points 72 that utilize other wireless protocols, such as WiFi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 72 allow handheld or other portable computing devices to communicate over a respective wireless network that is different from the wireless communications network 70 and that supports a different wireless protocol than the wireless communications network 70. For example, a portable computing device may be a mobile workstation or diagnostic test equipment that is utilized by a user within the process plant. In some embodiments, the portable computing device communicates over the process control network 100 using a wireless access point 72. In some scenarios, in addition to portable computing devices, one or more process control devices (e.g., controller 11, wired field devices 15-22, or wireless devices 35, 40-58) may also communicate using the wireless network supported by the access points 72.

Although FIG. 1 illustrates a single controller 11 with a finite number of field devices 15-22, 40-50, this is only an illustrative and a non-limiting embodiment. Any number of controllers 11 may be included in the provider devices of the process control network 100, and any of the controllers 11 may communicate with any number of wired or wireless field devices 15-22, 40-50 to control a process in the plant 10. Furthermore, the process plant 10 may also include any number of wireless gateways 35, routers 58, access points 55, 72, host computers 13, and/or wireless communications networks 70.

For example, wireless networks may be deployed throughout the process control system as disclosed in U.S. Pat. No. 7,436,797 incorporated by reference above. As a result, some or all of the I/O devices within a process control system, such as sensors and actuators, may be deployed and communicatively coupled to the process control system using hardwired technologies, wireless technologies or combination thereof. For example, hardwired communications may be maintained between and among some of the controller 11, the host computers 13, and the field devices 15-22, whereas wireless communications may be established between and among others of the controller 11, the host computers 13, and field devices 40-50. Again, wireless technologies may include, but are not limited to, WiFi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols, as well as satellite, Wi-Max, and other long-range wireless transmission. In particular, wireless technologies may include any commercial off-the-shelf wireless products to transmit process control data. A network protocol may be implemented on top of the wireless technology, or a new process control standard may be developed for wireless communication, such as WirelessHART®.

Figure 2:
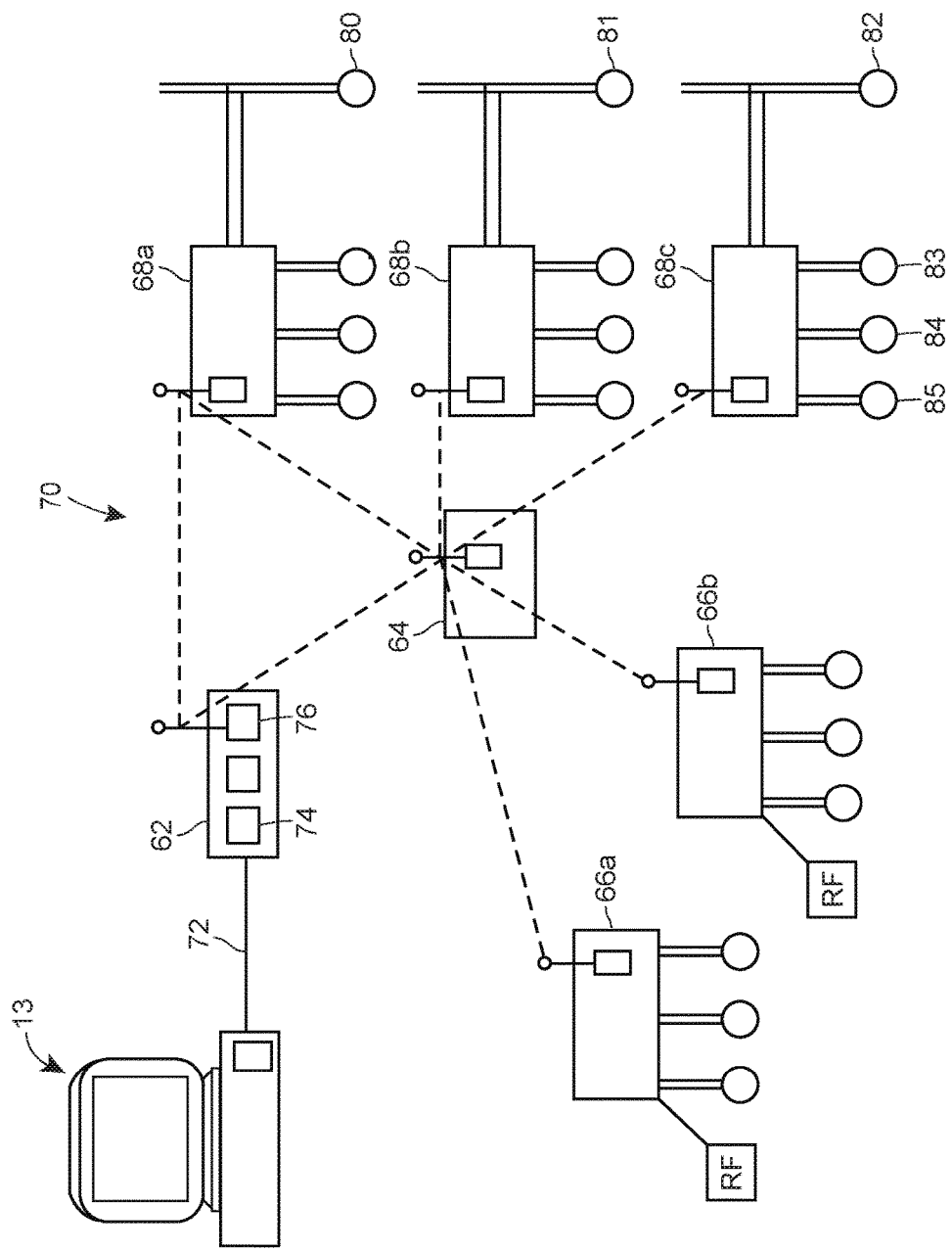
FIG. 2 is a combined block and schematic diagram of a wireless communication network within a portion of a process environment in accordance with this disclosure.

FIG. 2 illustrates the wireless communication network 70 of FIG. 1 that may be used to provide communications between the different devices illustrated in FIG. 1 and, in particular, between the controllers 12 (or the associated I/O devices 22) of FIG. 1 and the field devices 25-39, between the controllers 11 and the host workstations 13 or between the host workstations 13 and the field devices 40-50 of FIG. 1. However, it will be understood that the wireless communications network 70 of FIG. 2 could be used to provide communications between any other types or sets of devices within a process plant or a process environment.

The wireless communications network 70 of FIG. 2 is illustrated as including various communication nodes including one or more base nodes 62, one or more repeater nodes 64, one or more environment nodes 66 (illustrated in FIG. 2 as nodes 66a and 66b) and one or more field nodes 68 (illustrated in FIG. 2 as nodes 68a, 68b and 68c). Generally speaking, the nodes of the wireless communications network 70 operate as a self-healing, mesh-type communication network (also referred to as a wireless mesh network), wherein each node receives a communication, determines if the communication is ultimately destined for that node and, if not, repeats or passes the communication along to any other nodes within communication range. As is known, any node in a wireless mesh network may communicate with any other node in range to forward communications within the wireless mesh network, and a particular communication signal may go through multiple nodes before arriving at the desired destination.

As illustrated in FIG. 2, the base node 62 includes or is communicatively coupled to a work station or a host computer 13 which may be for example any of the hosts or workstations 13 of FIG. 1. While the base node 62 is illustrated as being linked to the workstation 13 via a hardwired Ethernet connection 72, any other communication link may be used instead. The base node 62 includes a wireless conversion or communication unit 74 and a wireless transceiver 76 to effect wireless communications over the network 70. In particular, the wireless conversion unit 74 takes signals from the host computer 13 and encodes these signals into a wireless communication signal which is then sent over the wireless communications network 70 via the transmitter portion of the transceiver 76. Conversely, the wireless conversion unit 74 decodes signals received via the receiver portion of the transceiver 76 to determine if that signal is destined for the base node 62 and, if so, further decodes the signal to strip off the wireless encoding to produce the original signal generated by the sender at a different node 64, 66 or 68 within the network 70.

As will be understood, in a similar manner, each of the other communication nodes including the repeater nodes 64, the environmental nodes 66 and the field nodes 68 includes a communication unit and a wireless transceiver (not shown) for encoding, sending and decoding signals sent via the wireless mesh network 70. While the different types of nodes 64, 66, 68 within the communication network 70 differ in some important ways, each of these nodes generally operates to receive wireless signals, decode the signal enough to determine if the signal is destined for that node (or a device connected to that node outside of the wireless wireless communications network 70), and repeat or retransmit the signal if the signal is not destined for that node and has not previously been transmitted by that node. In this manner, signals are sent from an originating node to all the nodes within wireless communication range, each of the nodes in range which are not the destination node then retransmits the signal to all of the other nodes within range of that node, and the process continues until the signal has propagated to all of the nodes within range of at least one other node. However, the repeater node 64 operates to simply repeat signals within the wireless communications network 70 to thereby relay a signal from one node through the repeater node 64 to a second node 62, 66 or 68. Basically, the function of the repeater node 64 is to act as a link between two different nodes to assure that a signal is able to propagate between the two different nodes when these nodes are not or may not be within direct wireless communication range of one another. Because the repeater node 64 is not generally tied to other devices at the node, the repeater node 64 only needs to decode a received signal enough to determine if the signal is a signal that has been previously repeated by the repeater node (that is, a signal that was sent by the repeater node at a previous time and which is simply being received back at the repeater node because of the repeating function of a different node in the wireless communications network 70). If the repeater node has not received a particular signal before, the repeater node 64 simply operates to repeat this signal by retransmitting that signal via the transceiver of the repeater node 64. It should be noted, however, that repeater nodes 64 may not be necessary within a wireless mesh network, provided there is a sufficient number of other nodes 66, 68 in communication with one another to avoid isolated nodes and/or pinch points. That is, when a node must rely upon a single node or a limited number of nodes to route messages to the base node 62, a pinch point (also known as a communication bottleneck) may occur within the network. Repeater nodes 64 may be used to alleviate pinch points or the risk of pinch points (i.e., the risk of a pinch point occurring if a node 66, 68 fails).

On the other hand, each of the field nodes 68 is generally coupled to one or more devices within the process plant environment and, generally speaking, is coupled to one or more devices, illustrated as field devices 80-85 in FIG. 2. Similar to FIG. 1, the field devices 80-85 may be any type of field devices including, for example, four-wire devices, two-wire device, HART devices, WirelessHART® devices, Fieldbus devices, 4-20 mA devices, smart or non-smart devices, etc., such as the devices 40-50 of FIG. 1. For the sake of illustration, the field devices 80-85 of FIG. 2 are illustrated as HART field devices, conforming to the HART communication protocol. Of course, the devices 80-85 may be any type of device, such as a sensor/transmitter device, a valve, a switch, etc., such as field devices. Additionally, the devices 80-85 may be other than traditional field devices such as controllers 12, I/O devices 22A-20B, work stations 14, or any other types of devices. It should also be understood that a field node 68 (as well as the nodes 66) may be integrated with the device to which it corresponds, thereby creating a wireless device, such as wireless controllers, wireless I/O devices, wireless workstations, wireless field devices, etc.

In any event, the field node 68a, 68b, 68c includes signal lines attached to their respective field devices 80-85 to receive communications from and to send communications to the field devices 80-85. Of course, these signal lines may be connected directly to the devices 80-85, in this example, a HART device, or to the standard HART communication lines already attached to the field devices 80-85. If desired, the field devices 80-85 may be connected to other devices, such as I/O devices 20A or 22A of FIG. 1, or to any other desired devices via hardwired communication lines in addition to being connected to the field nodes 68a, 68b, 68c. Additionally, as illustrated in FIG. 2, any particular field node 68a, 68b, 68c may be connected to a plurality of field devices (as illustrated with respect to the field node 68c, which is connected to four different field devices 82-85) and each field node 68a, 68b, 68c operates to relay signals to and from the field devices 80-85 to which it is connected.

In order to assist in the management in the operation of the wireless communications network 70, the environmental nodes 66 are used. In this case, the environmental nodes 66a and 66b includes or is communicatively connected to devices or sensors that measure environmental parameters, such as the humidity, temperature, barometric pressure, rainfall, or any other environmental parameters which may affect the wireless communications occurring within the wireless communications network 70. This information may be useful in analyzing and predicting problems within the wireless communications network 70, as many disruptions in wireless communications are at least partially attributable to environmental conditions. If desired, the environmental sensors may be any kind of sensor and may include, for example, HART sensors/transmitters, 4-20 mA sensors or on board sensors of any design or configuration. Of course, each environmental node 66a, 66b may include one or more environmental sensors and different environmental nodes may include the same or different types or kinds of environmental sensors if so desired. Likewise, if desired, one or more of the nodes 66a, 66b may include an electromagnetic ambient noise measurement device to measure the ambient electromagnetic noise level, especially at the wavelengths used by the wireless communications network 70 to transmit signals. Of course, if a spectrum other an RF spectrum is used by the wireless communications network 70, a different type of noise measurement device may be included in one or more of the environmental nodes 66. Still further, while the environmental nodes 66 of FIG. 2 are described as including environmental measurement devices or sensors, any of the other nodes 68 could include those measurement devices so that an analysis tool may be able to determine the environmental conditions at each node when analyzing the operation of the wireless communications network 70.

It will be noted that FIG. 2 is a schematic diagram and the placement of the environmental nodes 66a, 66b relative to the field nodes 68a-68c are not intended to be relative to their actual placement in an actual process control area. Rather, the environmental nodes 66a, 66b (and other environmental nodes not pictured or a single environmental node) are intended to be placed about the process control area in a logical and strategic manner as shown conceptually in FIGS. 3 and 4.

Figure 3:
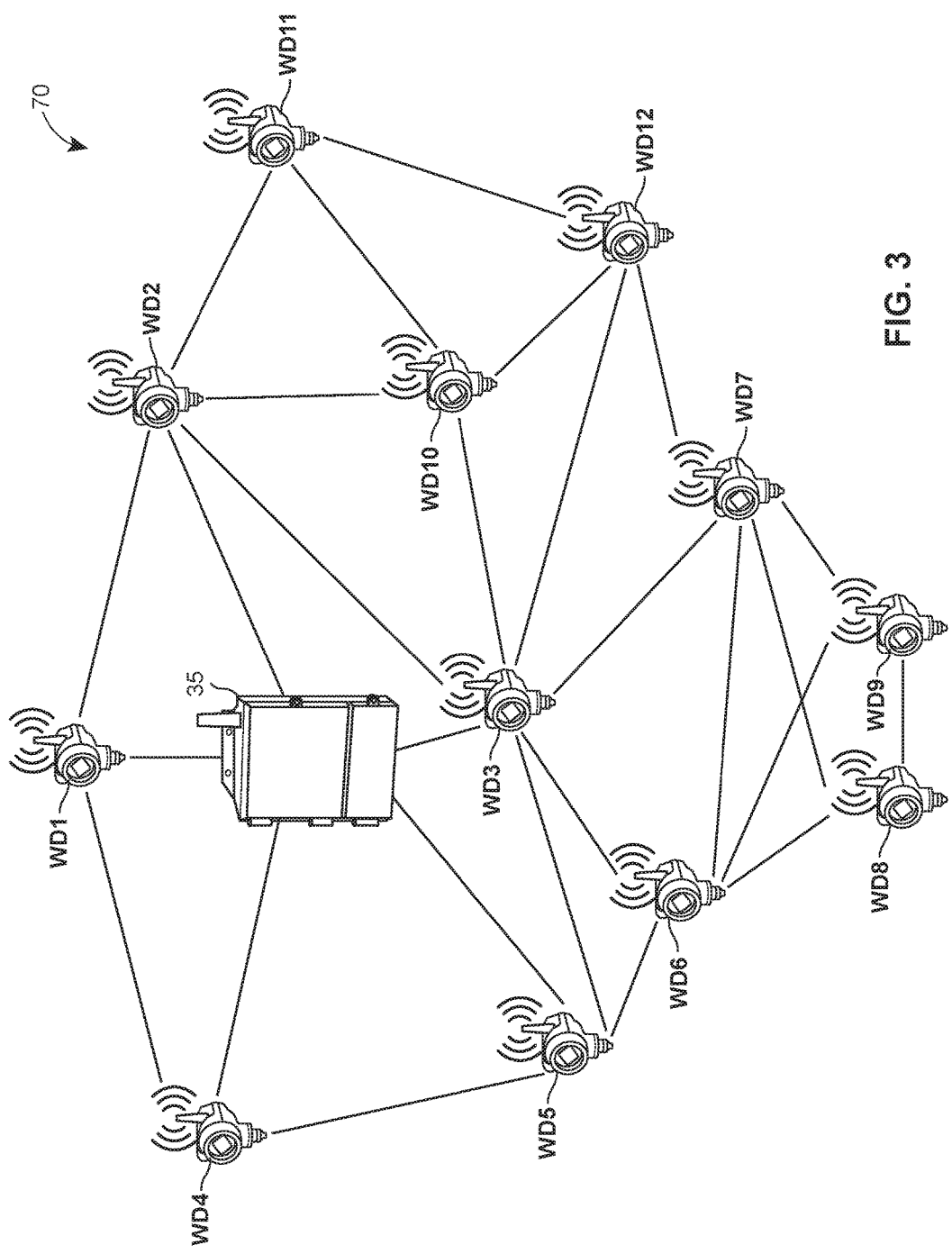
FIG. 3 is a schematic diagram of a wireless communication environment in which a wireless mesh network includes a plurality of wireless nodes corresponding to various field devices in accordance with this disclosure.

FIG. 3 is a further conceptual illustration of the wireless communications network 70 as a wireless mesh network with a wireless gateway 35 in communication with nodes WD1-WD12 which correspond to various field devices, such as field devices 40-50, and controllers, such as controllers 12, where the gateway 35 and nodes WD1-WD12 make up a wireless mesh network 70. The field devices and controllers to which the nodes correspond are generally considered smart-measurement, wireless-enabled process devices. Because the field devices and controllers are wireless-enabled process devices, they communicate within the wireless mesh network 70 and with the workstation 13, server 150 and or a computing device connected to the access point 72 as shown in FIG. 1 via the gateway 35. Thus, as with traditional hardwired network, the wireless-enabled process devices are able to exchange process data with the workstation 13, server 150, etc., and in a wireless mesh configuration, each wireless-enabled field device and controller serves not only as a client to receive and send its own data, but also as a repeater or relay to propagate data through the network to other process devices. Thus, each wireless-enabled field device and controller is a wireless node within the wireless mesh network 70. The term "wireless node" as used herein refers to a logical representation of a physical wireless-enabled process device within the wireless mesh network 70.

The wireless gateway 35 and wireless nodes WD1-WD12 communicate using a wireless communication protocol, such as the WirelessHART® protocol (IEC 62591), although other wireless protocols may also be used. WirelessHART® protocol is a time division multiple access (TDMA) channel access and channel hopping for communication within the wireless mesh network 70. Network manager software may be implemented on the wireless gateway 35 in order to schedule communications among nodes WD1-WD12 and the wireless gateway 35, and define communication paths within the wireless mesh network 70. Although FIG. 3 shows wireless mesh network 70 with only a single gateway 35, more than one gateway may be provided, in which case the gateways may share network manager software. Likewise, although only twelve wireless nodes are shown, a wireless mesh network can easily have dozens or hundreds of nodes making up the network.

The wireless mesh network 70 is, in turn, connected to host workstations or computers, servers, and other computing devices, similar to the network 70 connected to the host workstations or computers 13, and/or servers 150 via a communication link 105 in FIG. 1. The gateway 35 may correspond to the base node 62 above, and interfaces the wireless mesh network 70 with the host workstations 13 and/or servers 150 via the Ethernet connection 105 using a number of different protocols, such as those mentioned above. As such, while the wireless gateway 35 may be linked to the workstation 104 via the hardwired Ethernet connection, any other communication link may be used instead, such as a wireless communication link, examples of which were provided above.

Although not necessarily representative of the placement of the wireless nodes WD1-WD12 relative to their actual placement in an actual process control area, FIG. 3 does conceptually represent the placement of the wireless nodes WD1-WD12 relative to one another and relative to the wireless gateway 35. For example, in a wireless mesh network relative to the wireless gateway 35, wireless node WD3 is closest, wireless node WD1 is the next closest, then wireless node WD2, etc. Relative to wireless node WD1, gateway 35 is the closest, wireless node WD2 is the next closest, and wireless node WD5 is the next closest thereafter, and so on and so forth with every node in the wireless mesh network 70. Note, only those nodes that are in direct communication are considered as being relative to one another (i.e., neighbors to one another). It should also be noted that while FIG. 3 depicts the wireless mesh network 70 in two dimensions, in practice a wireless mesh network may be spread in all three dimensions such that nodes may be above or below the horizontal level of the gateway 35 and/or neighboring wireless nodes. In addition, wireless nodes may be proximate one another as to normally be considered neighbors, but are otherwise unable to establish a communication link with one another due to some form of electromagnetic and/or structural interference.

The zero hop counts for the wireless mesh network shown in FIG. 3 are shown in tabular form in FIG. 4. That is, the listing of wireless nodes (and the gateway, where applicable) in the rows represent each node's neighbor. However, it is not necessarily indicative of the route of messages through the network, particularly with respect to a mesh network where a data packet may take any of a number of routes to its destination.

Referring to FIG. 4, the wireless gateway 35 communicates directly with wireless nodes WD1 through WD5 and therefore the hop count between the wireless gateway 35 and any one of WD2 through WD5 is zero. Turning to the second row of the table of FIG. 4, it will be noted that the hop count between wireless node WD1 and each of the gateway 35, wireless node WD2, and wireless node WD4 is also zero as wireless node WD1 is illustrated in FIG. 3 as having direct communication with the gateway 35 and each of wireless nodes WD2 and WD4. Likewise, each of the remaining rows of the table in FIG. 4 demonstrate the zero hop counts for each of the wireless nodes WD2-WD12. As shown in FIGS. 3 and 4, the gateway 35 has five neighboring nodes (i.e., WD1-WD5), and each of the wireless nodes has at least three neighboring wireless communication devices (i.e., either the gateway 35 and/or neighboring nodes). This may follow a matter of best practice in order to maintain a robust, self-healing mesh network whereby the gateway 35 is required to have at least five neighbors, and each wireless node is required to have at least three neighbors. Of course, other standards may be applied to determine the topology of the wireless mesh network depending on the particular best practice requirements.

As field devices and controllers are implemented within a process control system, wireless nodes are added to the network in accordance with the best practice rule. Likewise, field devices and controllers may be taken offline or removed from the process control system, thus removing wireless nodes from the network. As wireless nodes are added or removed from a network, the communication paths may change. Accordingly, the gateway 35, host computer 13 and/or server 150 may periodically gather information about the network using various diagnostic tools in order to identify, define and/or update the communication paths/ routes therein.

As is known, the gateway 35 may collect information about the wireless mesh network 70, including information about each wireless node WD1-WD12. For example, as mentioned above with respect to a wireless mesh network 70, network manager software may be used to schedule communications and define communication paths within the wireless mesh network 70. In particular, the network manager defines communication paths for messages transmitted from the gateway 35 to the various wireless nodes WD1-WD12, and vice versa. The communication routes are assigned by network manager using information received from each of the wireless nodes WD1-WD12. As each wireless node is introduced into the network, the wireless node communicates with other wireless nodes within range to determine its neighbors (i.e., other wireless nodes or the gateway 35 in direct active communication with the wireless node). Each wireless node measures the received signal strength, referred to as the received signal strength indicator (RSSI) which is a measure of the power of a received signal, during each communication with a neighbor, among other statistics regarding communications with its neighbors.

Information about each node's neighbors and corresponding RSSI may be transmitted to the gateway 35 and used by the network manager software. For example, the network manager software may use the neighbor information and RSSI information to determine the communication routes for incoming and outgoing messages. For each communication path, the network manager software identifies the neighboring nodes for the various hops in the path. The nodes within a communication path may be classified as a parent or a child, where a parent is a device that passes communications through itself for another device (its child), and a child is a device that communicates through another device (a parent) to reach a third device or gateway.

Each of wireless nodes WD1-WD12 periodically reports its communication statistics to the gateway 35. These statistics are used by the network manager software to determine communication routes and assign time slots for messages. The communication statistics may include identification of neighbors, received signal strength indicators (RSSI) from each neighbor, received signal strength indicators (RSSI) to each neighbor, the percentage of successful communications with each neighbor, number of parents and children to that particular node, parent-to-children ratio, parent-to-neighbor ratio, and children-to-neighbor ratio, whether the node is within range of gateway 35, and whether the wireless node is in direct communication with the gateway 35. Additionally, each wireless node may report an indication of its battery condition, such as remaining charge, battery stability, recharge rate/time, and other battery diagnostics.

In addition, using diagnostic tools, such as the network manager software, the connectivity status/condition for each wireless node within a mesh network may be determined from the communication statistics, including identification of connectivity conditions within the wireless mesh network 70, where a connectivity condition is an anticipated failure of a communication ability within the mesh network. Examples of failures within the wireless mesh network include, but are not limited to, communication devices failures (i.e., failure of a wireless node to communicate with other nodes or the gateway), communication path failures (i.e., two neighboring wireless nodes are unable to communicate with one another, though may still communication with other neighbors), and pinch points (i.e., a wireless node whose failure would result in at least one other wireless node no longer having a communication path to the gateway). As one example, the network manager software may utilize a pinch point diagnostic tool to determine pinch points within the mesh network. An example of a pinch point analysis is disclosed in U.S. Application Publication No. 2011/0164512 entitled "Wireless Mesh Network With Pinch Point and Low Battery Alerts," the contents of which are expressly incorporated by reference herein. As disclosed therein, there are several methods for determining pinch points within a network. For example, best practice for the minimum number of neighbors for the gateway may be used as an indication of a pinch point condition (e.g., if fewer than 5 devices communicate directly with (or are in range of) the gateway, or if less than a percentage of all wireless nodes in the mesh network are within range of the gateway). It is noted however, that this indicates the presence of a possible pinch point, but not necessarily which wireless node(s) is acting as a pinch point.

Another method of identifying pinch points utilizes a maximum number of neighbors for each wireless node. If a particular wireless node has a large number of neighbors (e.g., greater than a threshold number), this may indicate that it is a pinch point.

A further method of identifying a pinch point utilizes the parent-to-children ratio, parent-to-neighbor and/or child-to-neighbor ratio of each wireless node. A pinch point may be identified if the wireless node has an unusually large or unusually small parent-to-children ratio, parent-to-neighbor ratio or child-to-neighbor ratio. The statistical deviation of the parent-to-children ratio parent-to-neighbor ratio or child-to-neighbor ratio from average values within the network can also be used as an indication of a pinch point. In addition, the statistical deviation of the number of neighbors at a particular wireless node with respect to the average number of neighbors for each wireless node within the network may indicate that the particular wireless node is a pinch point.

Figure 5:
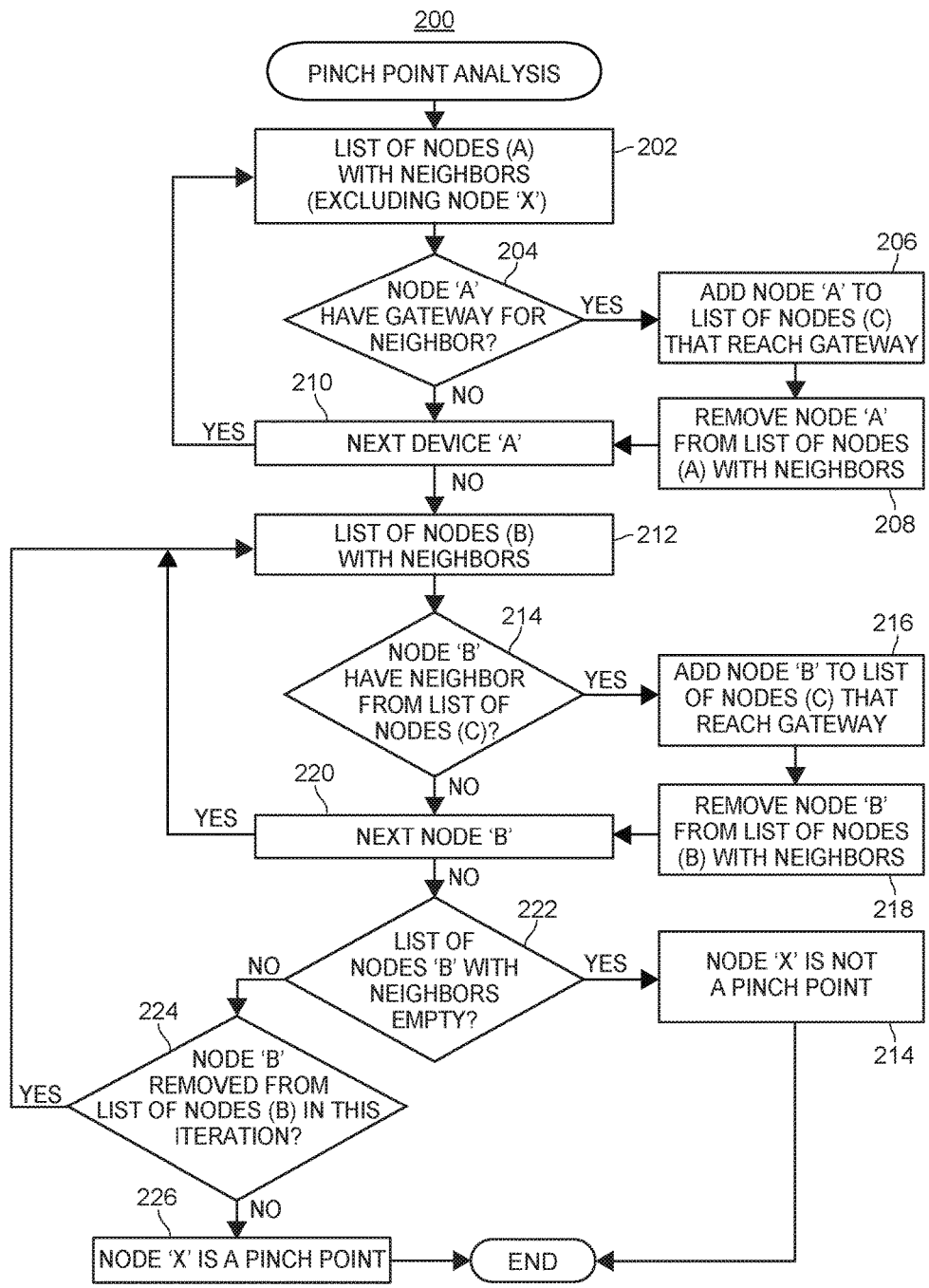
FIG. 5 is a flowchart of a pinch point analysis routine to identify pinch points within the wireless mesh network and wireless nodes dependent upon the pinch points in accordance with this disclosure.

A still further method to identify pinch points is shown with respect to FIG. 5, which uses neighbor information provided by the wireless nodes to identify pinch points based on communication paths between the wireless nodes and the gateway 35, without requiring parent/child information to the device. FIG. 5 is a flowchart of a pinch point analysis routine 200 showing the evaluation of each wireless node (X) within the mesh network to determine whether it is a pinch point. In evaluating wireless node X, the routine accesses a list of wireless nodes (A) having neighbors, excluding the wireless node X under evaluation at block 202. For each wireless node A in the list, the routine 200 begins with the assumption that none of the wireless nodes A can reach the gateway. For each wireless node A in the list of wireless nodes with neighbors, the routine 200 determines whether the wireless node A has the gateway as a neighbor at block 204. If the wireless node A has the gateway as a neighbor (i.e., communicates directly with the neighbor), the wireless node A is added to a list of wireless nodes (C) that are able to communicate with the gateway at block 206. In addition, the wireless node A is removed from the list of wireless nodes (A) that cannot reach the gateway at block 208. The routine 200 then proceeds to the next wireless node A within the list at block 210. Alternatively, if the wireless node A at block 204 does not have the gateway as a neighbor, routine 200 proceeds to the next wireless node A at block 210. If there is another wireless node A to test, the routine 200 returns to block 202 and repeats the process. This continues until the last wireless node A has been evaluated.

Having evaluated each of the wireless nodes A as above and removed those that have the gateway as a neighbor, a resulting list of wireless nodes (B) at block 212 are those wireless nodes from the list of wireless nodes (A) with neighbors that do not include the gateway. That is, the resulting list of wireless nodes (B) are those that do not have the gateway as a neighbor and are still assumed to not be able to reach (i.e., communicate with) the gateway indirectly.

The routine 200 then proceeds to test each wireless node B in the list of wireless nodes (B) at block 214 which cannot reach the gateway. In particular, the routine 200 determines if the wireless node B has a neighboring wireless node C in the list of wireless nodes (C) that are able to reach the gateway. If wireless node B does have a neighbor in the list of wireless nodes (C) which can reach the gateway, wireless node B is considered to be in indirect communication with the gateway, and wireless node B is added to the list of wireless nodes (C) which can reach the gateway at block 216. In addition, the wireless node B is removed from the list of wireless nodes (B) that cannot reach the gateway at block 218. The routine 200 then proceeds to the next wireless node B within the list at block 220. Alternatively, if the wireless node B at block 214 does not have a neighbor from the list of wireless nodes (C), the routine 200 proceeds to the next wireless node B at block 220. If there is another wireless node B to test, the routine 200 returns to block 212 and repeats the process. This continues until the last wireless node B in the list of wireless nodes (B) has been evaluated.

Having evaluated each of the wireless nodes B as above and removed those that have a wireless node C as a neighbor, the routine 200 determines whether the list of devices (B) which cannot reach the gateway is empty at block 222. If the answer is yes, wireless node X is not considered a pinch point at block 214, because the routine 200 has determined that all wireless nodes except wireless node X are able to communicate with the gateway, and the routine 200 for wireless node X ends.

On the other hand, if the list of wireless nodes (B) which cannot reach the gateway is not empty as determined at block 222, the routine 200 determines whether a wireless node B was removed from the list of wireless nodes (B) that cannot reach the gateway in the latest iteration at block 224. If the answer is yes, the routine 200 returns to block 212 to evaluate if any of the remaining wireless nodes B now has a wireless node C as a neighbor, the list of wireless nodes (C) being updated each time a wireless node B is removed from the list of wireless nodes (B) and added to the list of wireless nodes (C). If the answer is no, the wireless node X under evaluation is identified as a pinch point at block 226, as the wireless nodes remaining in the list of wireless nodes (B) cannot reach the gateway without the wireless node X. At that point, the routine 200 ends. The process illustrated in FIG. 5 is repeated for each wireless node X that is identified as having neighbors within mesh network 16. When all wireless nodes have been evaluated using the routine 200 of FIG. 5, the result is a complete list of wireless nodes identified as pinch points within the mesh network.

A further commonly used diagnostic tool is a tracing tool such as traceroute, which determines the route of communications in the network and measures transit delays of messages across the network. As is generally known, traceroute sends a sequence of echo request packets addressed to a destination node. Traceroute determines the intermediate nodes traversed in the communication path by adjusting time-to-live (TTL) (hop limit) network parameters. The TTL (hop limit) value is decremented at each node in the communication path, a packet discarded when the TTL value has reached zero, and an error message returned to the message origin indicating time exceeded. The TTL value (hop limit) is increased for each successive set of packets sent, where a first set of packets have a hop limit value of 1 with the expectation that they are not forwarded on by the first node. The first node then returns the error message back to the origin. The next set of packets have a hop limit value of 2, so that they are not forwarded beyond the second node in the communication path, and the second node sends the error reply. This continues until the destination node receives the packets and returns an echo reply message. Traceroute uses the returned messages to produce a list of nodes that the packets have traversed. The timestamp values returned for each node along the path are the delay (latency) values, typically measured in milliseconds. Thus, the number of hops and latency values may be determined for the network, and, in turn, the communication route may be determined for the network.

Figure 6:
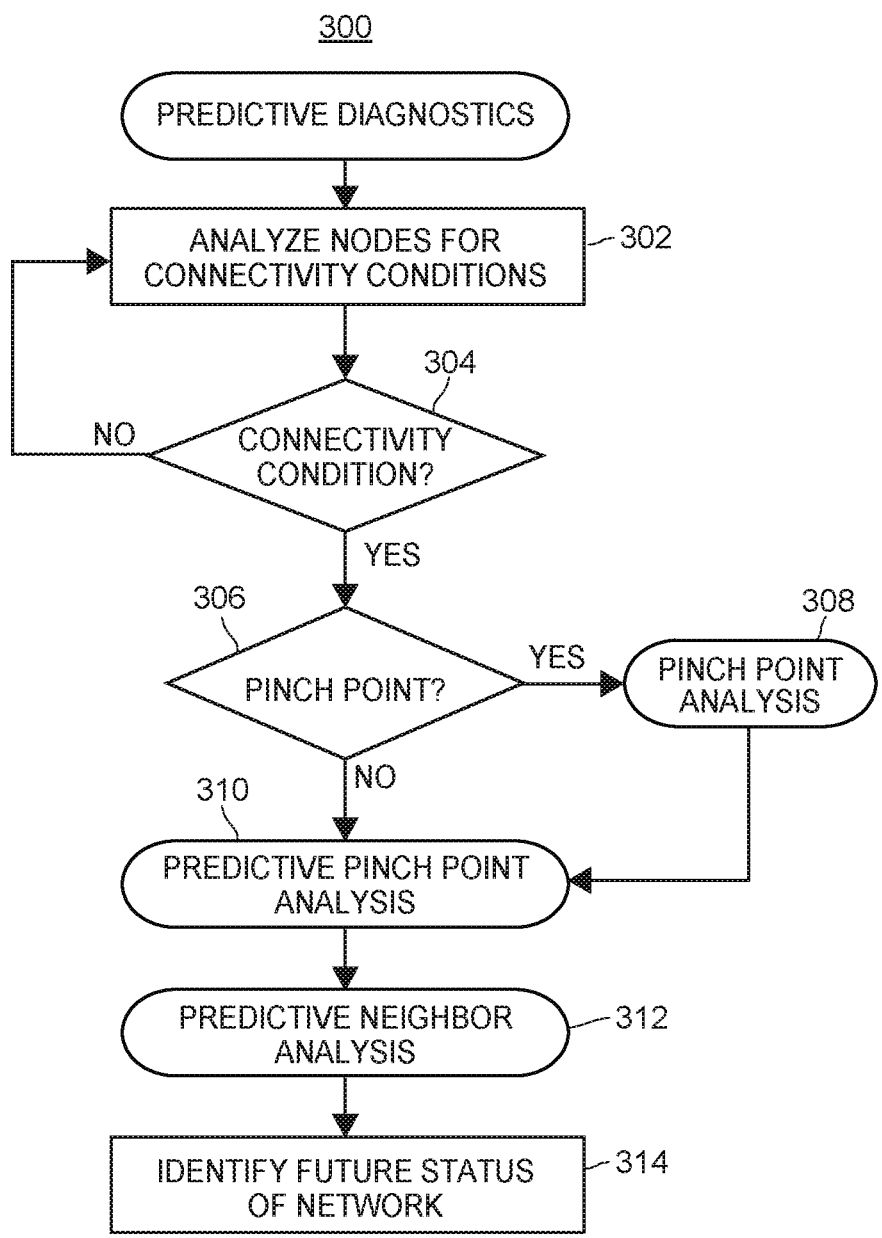
FIG. 6 is a flowchart of a predictive diagnostics routine to predict communication device failure and communication path failures in accordance with this disclosure.

Referring now to FIG. 6, the network manager may execute a predictive diagnostics routine 300 is shown and explained with reference to the exemplary wireless mesh network 70 of FIG. 3. In summary, the predictive diagnostics routine 300 identifies connectivity conditions within the wireless mesh network 70 based on the information collected about the wireless nodes WD1-WD12 within the network 70. If a connectivity condition exists, the predictive diagnostics routine 300 assumes failure of a communication ability within the wireless mesh network 70 related to the connectivity condition, and analyzes the wireless mesh network 70 to identify which wireless nodes will be affected by the communication failure, thereby predicting the future state of the wireless mesh network 70.

Beginning at block 302, the predictive diagnostics routine 300 analyzes the information about each of the wireless nodes WD1-WD12 within the network 70. Such information may include, but is not limited to, the communication statistics reported by each of the wireless nodes WD1-WD12 to the gateway 35 mentioned above. The connectivity conditions within the wireless mesh network 70 may be determined from the communication statistics, including anticipated failures of communication abilities of or amongst the wireless nodes WD1-WD12. For example, connectivity conditions may be caused by pinch points, low battery level, and communication path instability. In each case, it is anticipated that the connectivity condition will eventually fail, thereby causing a failure in a communication ability within the wireless mesh network 70.

A pinch point may refer to a wireless node whose failure would result in at least one other wireless node no longer having a communication path to the gateway 35. Various diagnostics for identifying pinch points within the wireless mesh network 70 were described above, with an exemplary method disclosed with reference to FIG. 5.

Low battery level may refer to a depleted electrical storage in the battery, as represented by the charge level in the battery (e.g., 50% charge remaining), time to complete battery discharge (e.g., 2 days until complete discharge), time to threshold discharge (e.g., 2 days until 90% discharge), etc. With respect to threshold discharge, the threshold may vary depending upon the criticality of the field device associated with the wireless node, such that more critical field devices are associated with a higher threshold (e.g., 70% discharge) than less critical field device (e.g., 90% discharge). Evaluating the criticality of field devices is well-understood by those of ordinary skill in the art, and need not be described further herein. Low battery level may also refer to depleted health of the battery, as represented by, for example, a rate of discharge, charge capacity, self-diagnostics by the wireless node, etc.

Low stability may refer to instability in a communication path between neighboring wireless communication devices (e.g., between wireless nodes or between a wireless node and the gateway 35). For example, as shown in FIG. 3, instability in the communication path between wireless nodes WD5 and WD6 is indicated by the broken communication line. Wireless nodes WD5 and/or WD6 may provide communication statistics such as a percentage of successful transmissions between wireless nodes WD5 and WD6 below a particular threshold, or received/transmitted RSSI between wireless nodes WD5 and WD6 below a particular threshold, which may indicate instability in the communication path between wireless nodes WD5 and WD6.

Each of pinch points, low battery levels, and communication path instabilities may give rise to failure of a communication ability within the wireless mesh communication network 70. For example, if wireless node WD6 has a low battery level, failure of the battery would cause a communication device failure in WD6 (i.e., it cannot communicate with its neighbors, WD3, WD5, WD7, WD8 and WD9, and therefore cannot communicate within the wireless mesh network 70). A communication path instability may give rise to a communication path failure between neighboring wireless communication devices (i.e., between wireless nodes or between a wireless node and the gateway 35), which, in turn, may create a new pinch point or a potential pinch point (i.e., a wireless node has less than the required threshold of neighbors). Moreover, communication path instability involving a pinch point may result in communication device failures in the pinch point and/or communication device failures for wireless nodes dependent upon the pinch point to reach the gateway 35. A pinch point, by itself, may decrease the communication reliability of wireless nodes that communicate through the pinch point, and limit bandwidth for wireless nodes that communication through the pinch point. Further, a pinch point may consume additional power to transmit the increased communications load, which may lead to quicker depletion of the battery level for battery-powered wireless nodes, which, in turn, leads to a communication device failure in the pinch point and communication device failures for wireless nodes dependent upon the pinch point to reach the gateway 35.

Returning to FIG. 6, if no connectivity conditions exist as determined at block 304, the predictive diagnostics routine 300 continues to analyze the wireless nodes WD1-WD12 at block 302. On the other hand, if one or more connectivity conditions exist, the predictive diagnostics routine 300 proceeds to execute various analyses to predict the effect on the wireless mesh communication network 70, and, more particularly, on each of the wireless nodes WD1-WD12, should the connectivity condition result in a failure of a communication ability. At a minimum, the predictive diagnostics routine 300 generates predicted pinch points and potential pinch points within the wireless mesh network 70 by assuming the communication ability anticipated by the connectivity condition has failed.

Figure 7:
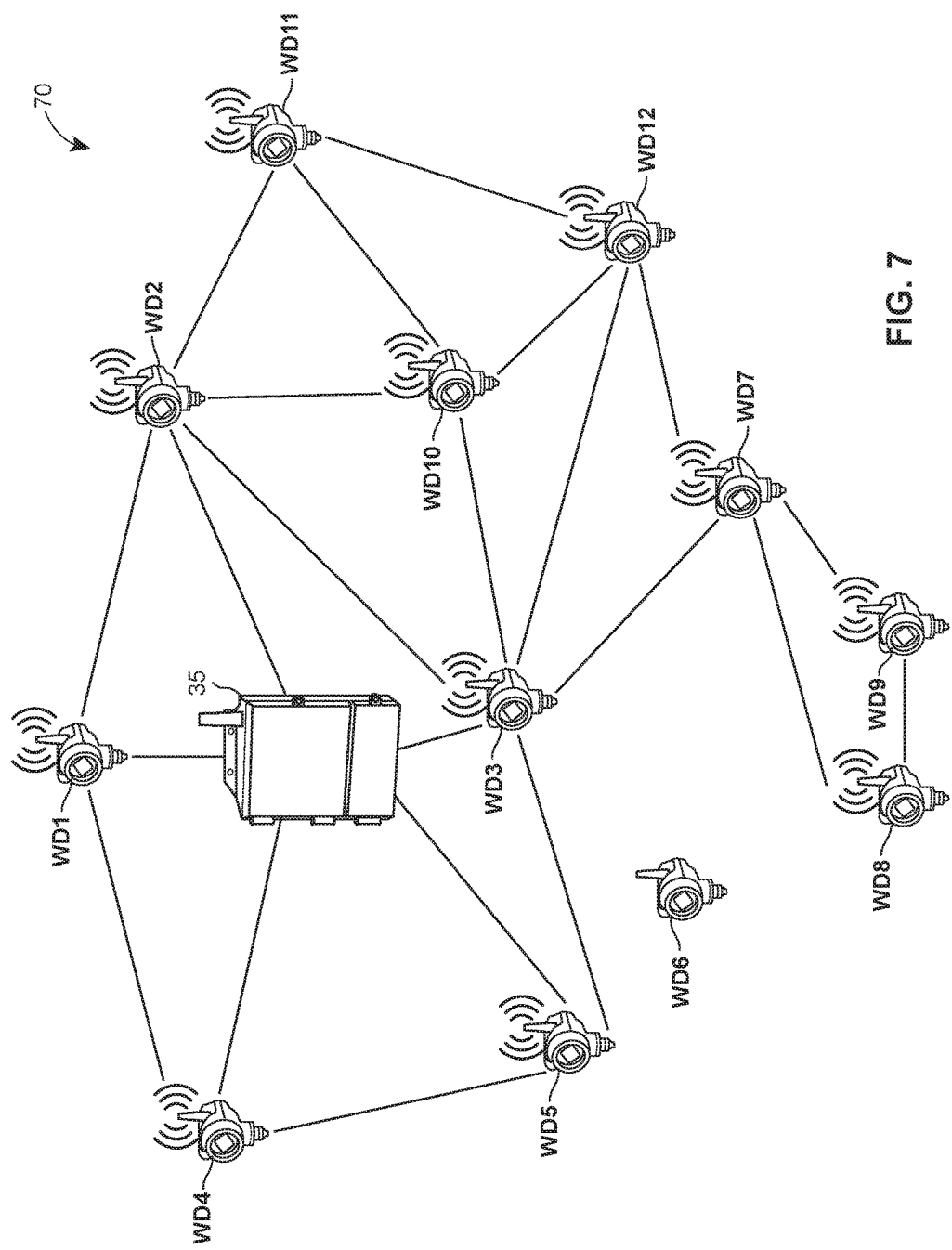
FIG. 7 is a schematic diagram of a wireless communication environment in which the wireless mesh network of FIG. 3 has a predicted communication device failure in accordance with this disclosure.

For example, the predictive diagnostics routine 300 may respond to a low battery condition by assuming that the wireless node with the low battery was no longer communicating within the wireless mesh network 70 due to battery failure (e.g., depleted charge). FIG. 7 conceptually shows this assumption if the wireless node WD6 has a low battery condition. More particularly, the predictive diagnostics routine 300 assumes that wireless node WD6 experienced a communication device failure and is no longer communicating within the wireless mesh network 70.

Figure 8:
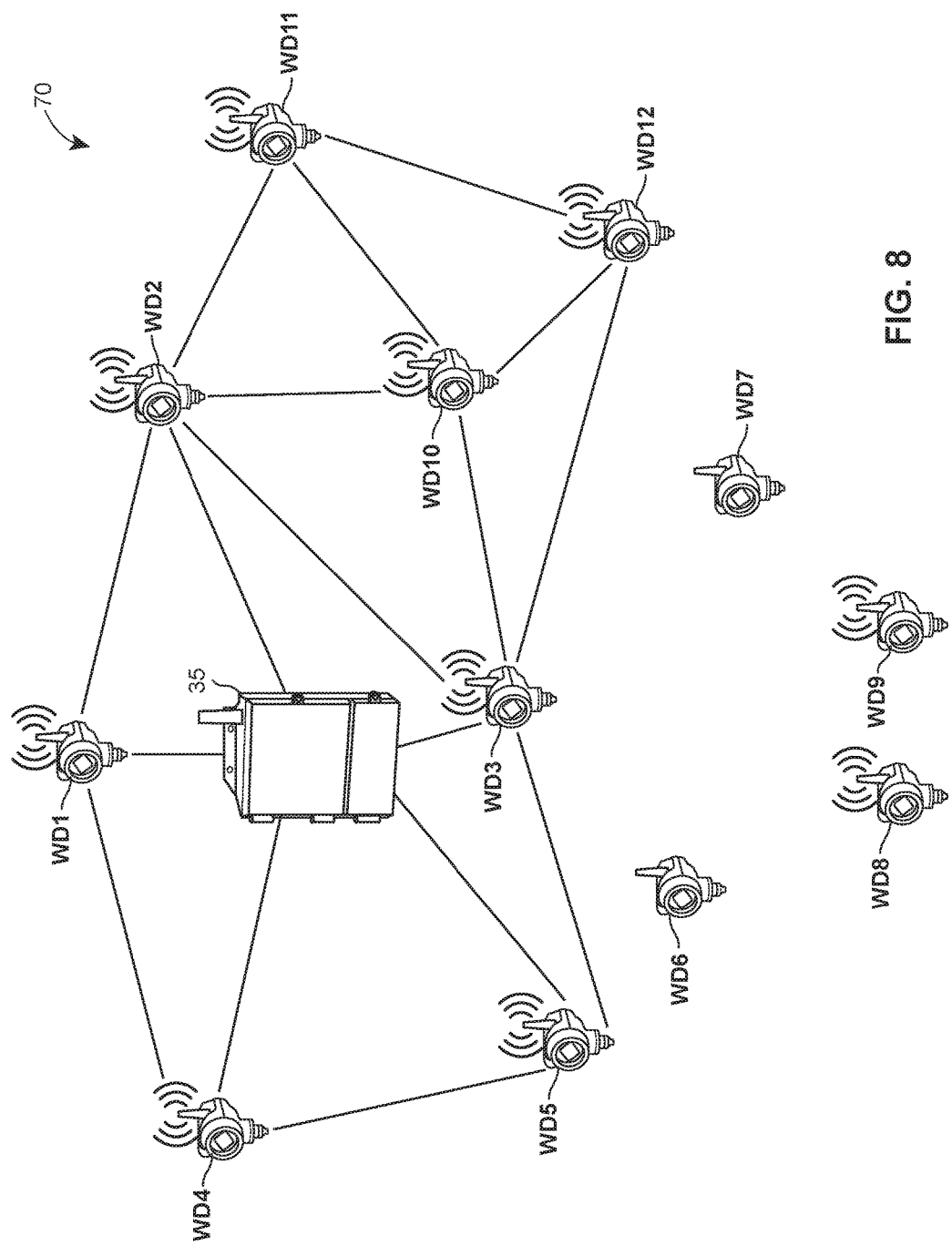
FIG. 8 is a schematic diagram of a wireless communication environment in which the wireless mesh network of FIG. 7 has a predicted communication device failure at a pinch point in accordance with this disclosure.

In addition, the predictive diagnostics routine 300 may respond to a pinch point condition by assuming that the wireless node acting as a pinch point was no longer communicating within the wireless mesh network 70. As seen in FIG. 7, the wireless node WD7 is a pinch point for wireless nodes WD8 and WD9 by virtue of the communication failure of wireless node WD6 (i.e., wireless nodes WD8 and WD9 can only communicate with the gateway 35 via wireless node WD7). FIG. 8 conceptually shows this assumption if wireless node WD7 is a pinch point. More particularly, in the case of wireless node WD7 being a pinch point, the predictive diagnostics routine 300 assumes that wireless node WD7 experienced a communication device failure is no longer communicating within the wireless mesh network 70.

Figure 9:
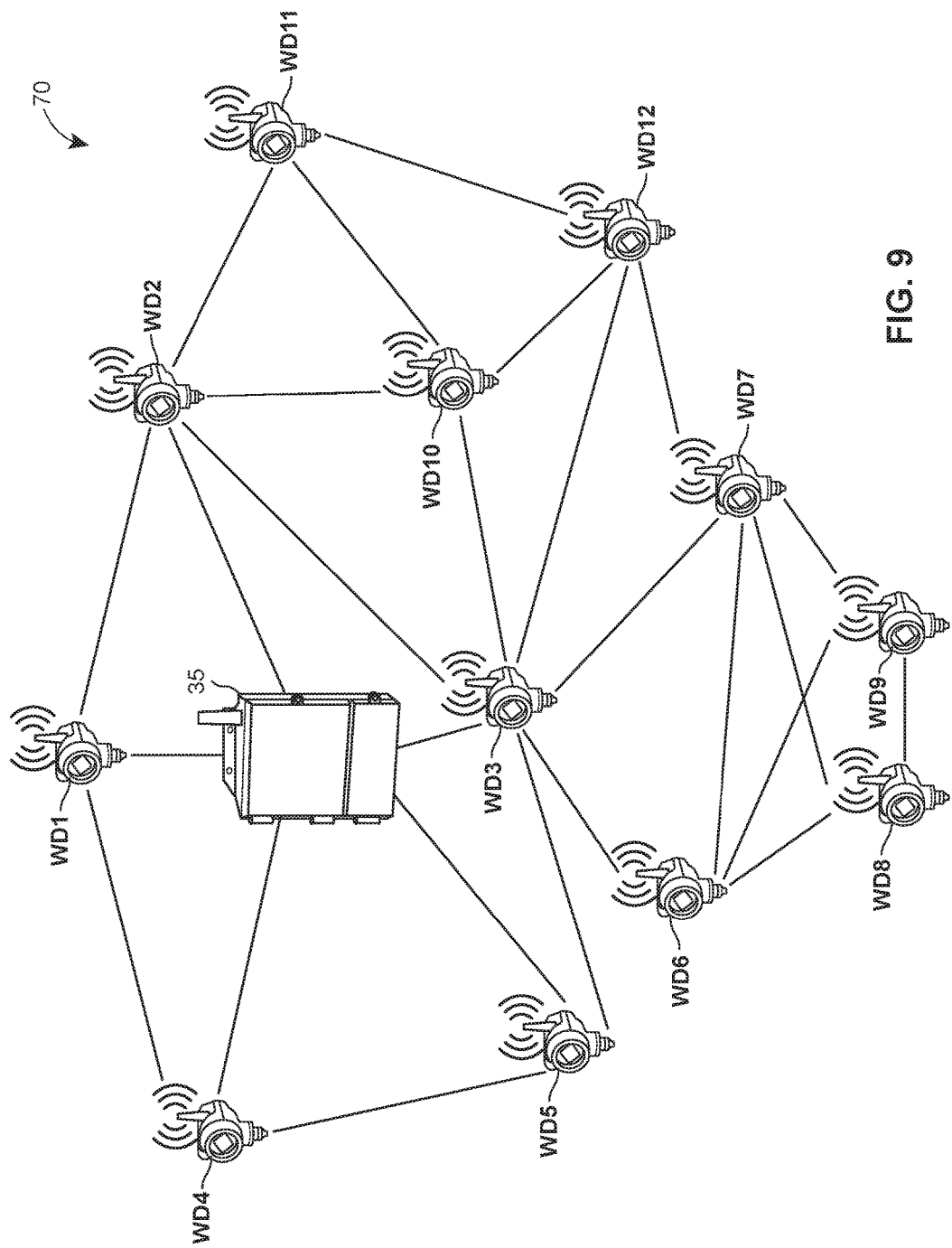
FIG. 9 is a schematic diagram of a wireless communication environment in which the wireless mesh network of FIG. 3 has a predicted communication path failure in accordance with this disclosure.

As a further example, the predictive diagnostics routine 300 may respond to a low stability condition by assuming that the communication path between the two wireless communication devices had failed such that the two wireless communication devices are no longer communicating with one another. FIG. 9 conceptually shows this assumption if the communication path between wireless nodes WD5 and WD6 is unstable as depicted by the broken line in FIG. 3. More particularly, the predictive diagnostics routine 300 assumes that wireless node WD6 is no longer communicating with wireless node WD5 due to a communication path failure, though both may continue to otherwise communicate within the wireless mesh network 70.

Referring back to FIG. 6, before conducting any of the predictive analyses, the predictive diagnostics routine 300 may determine whether or not the wireless node with the connectivity condition is a pinch point at block 306. That is, if the wireless node having the connectivity condition is not a pinch point, it obviates the need for the pinch point analysis at block 308. However, if the wireless node having the connectivity condition is a pinch point, the pinch point analysis at block 308 determines which wireless nodes are dependent upon the pinch point to reach the gateway 35. In one embodiment, neighbor information, and particularly child information, reported by the pinch point may be used to identify wireless nodes dependent up on the pinch point. However, this alone does not necessarily provide information on all wireless nodes dependent upon the pinch point; only wireless nodes that are in direct communication with, and are child nodes of, the pinch point. As such, neighbor information of each child node may further be used to identify nodes dependent upon the pinch point for reaching the gateway 35.

As an alternative embodiment, the pinch point analysis routine 200 of FIG. 5 may be utilized to identify wireless nodes dependent upon the pinch point. However, rather than apply the routine 200 to each of the wireless nodes WD1-WD12 within the wireless mesh network 70, the routine 200 need only be applied to the wireless node WD7 acting as a pinch point. Rather than identifying pinch points, the routine 200 may be executed using the pinch point WD7 as wireless node X. More particularly, the resulting execution of the routine 200 will include evaluating each of the wireless nodes in the list of wireless nodes (B), which are assumed as not being able to reach the gateway 35, and removing those that have wireless node C as a neighbor. This eliminates those wireless nodes that can communicate with the wireless gateway 35 via a communication path that does not involve the pinch point. Any wireless nodes remaining in the list of wireless nodes (B) after block 224 are considered dependent on the pinch point at block 308 of the predictive diagnostics routine 300. That is, the predictive diagnostics routine 300 may use the resulting list of wireless nodes (B) as identification of wireless nodes that are unable to reach the gateway 35 in the event of communication failure in the pinch point. As such, wireless nodes WD8 and WD9 are predicted to lose communication with the gateway 35 in the event the pinch point WD7 has a communication device failure as a result of the connectivity condition.

After conducting a pinch point analysis at block 308 to identify wireless nodes affected by communication device failure of a pinch point, the predictive diagnostics routine 300 proceeds to block 310 to conduct a predictive pinch point analysis. Even in the event the wireless node with the connectivity condition is not a pinch point as determined at block 306, the predictive diagnostics routine 300 may proceed to the predictive pinch point analysis 310 without conducting the pinch point analysis at block 308.

Figure 10:
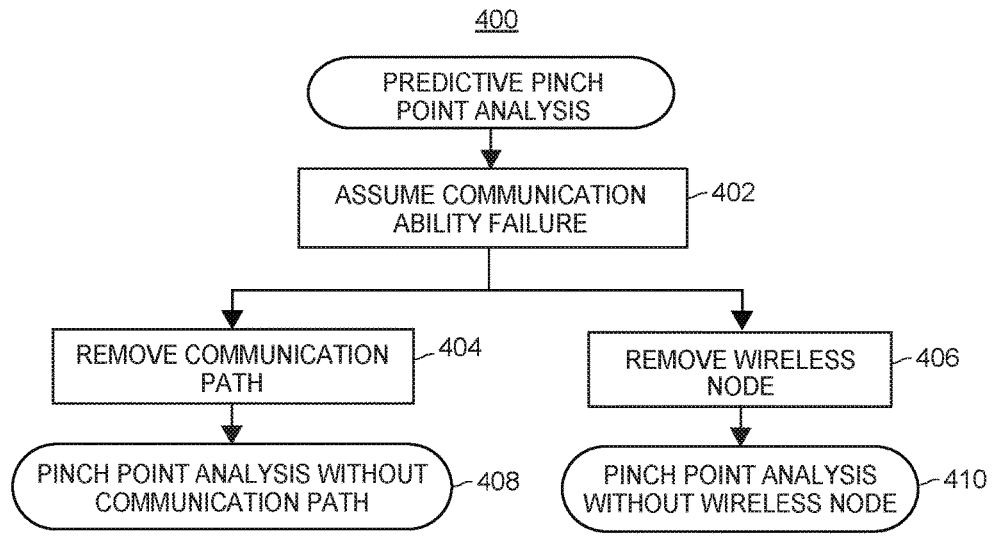
FIG. 10 is a flowchart of the predictive pinch point analysis routine of FIG. 6 to predict pinch points in the event of a communication failure.

The predictive pinch point analysis at block 310 generates predicted pinch points within the wireless mesh network 70 as a function of the failure of the communication ability and communication paths between each of the wireless nodes and the gateway 35. More particularly, FIG. 10 depicts an exemplary predictive pinch point analysis routine 400 which may be executed as the predictive pinch point analysis at block 310. Beginning at block 402, the predictive pinch point analysis routine assumes that the failure of the communication ability associated with the connectivity condition has occurred. As mentioned above, this may include, but is not limited to, communication device failure in the event of a low battery condition as shown conceptually in FIG. 7, communication device failure in the event of a pinch point condition as shown conceptually in FIG. 8, and communication path failure in the event of a low stability condition as shown conceptually in FIG. 9.

Depending on the connectivity condition that occurred, the predictive pinch point analysis routine 400 either removes the communication path at block 404 if, for example, the communication ability failure was caused by instability in a communication path between two wireless network communication devices, or removes the wireless node at block 408 if, for example, the communication failure was caused by a low battery condition or pinch point. In removing the communication path or wireless node, the predictive pinch point analysis routine 400 may effectively simulate the wireless mesh network 70 as if the communication ability has failed in order to predict the effect of the connectivity condition on the wireless nodes individually and the wireless mesh network 70 overall. As one example, the predictive pinch point analysis routine 400 may temporarily modify the communication statistics received by the gateway 35 or modify the results of diagnostics based on communication statistics from the wireless nodes. While described with reference to a simulation of one failure of a communication ability, the predictive pinch point analysis may simulate multiple failures as a result of multiple connectivity issues.

For instance, where a communication path is removed at block 404 between wireless nodes WD5 and WD6, communication routes assigned by the network manager may be modified to remove the communication path between wireless nodes WD5 and WD6. In addition, or in the alterative, identification of neighbors, received signal strength indicators (RSSI) from neighbors, received signal strength indicators (RSSI) to neighbors, the percentage of successful communications with neighbors, number of parents and children to that particular node, parent-to-children ratio, parent-to-neighbor ratio, and children-to-neighbor ratio may be updated for each of wireless nodes WD5 and WD6 with respect to one another (i.e., information on wireless node WD6 does not reflect wireless node WD5 has a neighbor, and vice versa).

In another instance, where a wireless node is removed from the wireless mesh network 70 (e.g., wireless node WD6 due to communication device failure), communication routes assigned by the network manager that involve WD6 may be modified to reroute messages along another communication route that does not involve WD6. In addition, or in the alternative, identification of neighbors, received signal strength indicators (RSSI) from neighbors, received signal strength indicators (RSSI) to neighbors, the percentage of successful communications with neighbors, number of parents and children to that particular node, parent-to-children ratio, parent-to-neighbor ratio, and children-to-neighbor ratio may be updated for each wireless node that has WD6 as a neighbor such that information on wireless node WD6 is not reflected in any of the communication statistics for the wireless mesh network 70.

Upon removing the communication path at block 404, the predictive pinch point analysis routine 400 executes a pinch point analysis, such as the pinch point analysis of FIG. 5, without the communication path at block 406. Similarly, upon removing the wireless node at block 408, the predictive pinch point analysis routine 400 executes a pinch point analysis, such as the pinch point analysis of FIG. 5, without the wireless node at block 410. The pinch point analysis may be thought of an analysis of communication paths between each of the wireless nodes WD1-WD12 and the gateway 35 in order to find pinch points within the wireless mesh network 70. As such, the predictive pinch point analysis routine 400 generates predicted pinch points as a function of the failure of the communication ability and the resulting communication paths between the wireless nodes WD1-WD12 and the gateway 35.

Referring again to FIG. 5, in conjunction with FIGS. 9 and 10, the pinch point analysis routine 200 may be executed for each wireless node within the wireless mesh communication network 70, with the exception of the communication path or wireless node removed in the preceding step. Thus, if wireless node WD6 reports a low battery condition and is removed at block 408, the pinch point analysis routine 200 may be executed with respect to the remaining wireless nodes WD1-WD5 and WD7-WD12. That is, the routine 200 evaluates each wireless node (X), where the wireless nodes (X) are WD1-WD5 and WD7-WD12. In evaluating each of WD1, WD2, WD4, WD5 and WD8-WD12 as wireless node (X), WD3 has the gateway 35 as a neighbor as determined at block 204, and is added to the list of nodes (C) that reach the gateway 35 at block 206. WD7 is included in the list of nodes (B) that do not have the gateway 35 as a neighbor at block 212, the test of WD7 at block 214 will have WD3 and/or WD12 as a neighbor in the list of wireless nodes (C) that can reach the gateway 35, and the tests of each of WD8 and WD9 at block 214 will, in turn, have WD7 as a neighbor. However, when WD7 is evaluated as wireless node (X), the tests of WD8 and WD9 at block 214 will not have WD7 as a neighbor, nor have any other wireless node as a neighbor in the list of wireless nodes (C). Thus, the pinch point analysis routine 200 determines that wireless node WD7 is a pinch point. As conceptually shown in FIG. 7, the low battery condition at WD6 results in a potential pinch point at WD7 if there is a communication device failure at WD6.

On the other hand, if there is a low stability condition in the communication path between wireless nodes WD5 and WD6, and the communication path is removed at block 404, the pinch point analysis routine 200 may be executed with all wireless nodes WD1-WD12, but without WD5 and WD6 being neighbors. That is, the routine 200 evaluates each wireless node (X), where the wireless nodes (X) are WD1-WD12. As determined at block 204, WD5 has the gateway 35 as a neighbor and is added to the list of nodes (C) that reach the gateway 35 at block 206. However, when WD6 is included in the list of nodes (B) that do not have the gateway 35 as a neighbor at block 212, the test of WD6 at block 214 will not have WD5 as a neighbor in the list of wireless nodes (C) that can reach the gateway 35 (though WD6 will have WD3 as a neighbor in the list of wireless nodes (C) that can reach the gateway 35). As conceptually shown in FIG. 9, the low stability condition between WD5 and WD6 does not result in a potential pinch point, even if there is a communication path failure between WD5 and WD6. Thus, the predictive pinch point analysis routine 400 may determine which, if any, wireless nodes may become a pinch point in the event the connectivity condition results in a failure of a communication ability within the wireless mesh communication network 70.

Referring back to FIG. 6, the predictive diagnostics routine 300 also conducts a predictive neighbor analysis at block 312. Though shown as being executed subsequent to the predictive pinch point analysis 310, the predictive neighbor analysis 312 may precede the predictive pinch point analysis 310, or the analyses may be conducted simultaneously. However, similar to the predictive pinch point analysis 310, even in the event the wireless node with the connectivity condition is not a pinch point as determined at block 306, the predictive diagnostics routine 300 may proceed to the predictive neighbor analysis 312 without conducting the pinch point analysis at block 308.

The predictive neighbor analysis 312 generates potential pinch points within the wireless mesh network 70 as a function of the failure of the communication ability and neighboring wireless communication devices in direct wireless communication with each of the wireless nodes. A potential pinch point is a wireless node that has less than a threshold number of neighboring wireless communication devices in direct wireless communication with the wireless node. That is, if there is a communication ability failure and a wireless node is left with fewer neighboring wireless communication devices than established by best practices, that wireless node may become a pinch point in the event of another failure of a communication ability within the wireless mesh network 70.

Figure 11:
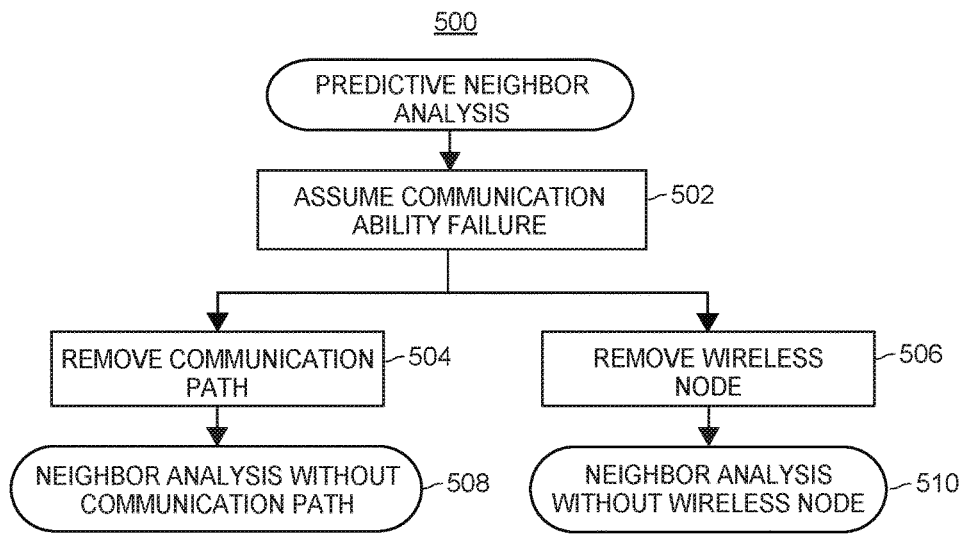
FIG. 11 is a flowchart of the predictive neighbor analysis routine of FIG. 6 to predict wireless nodes that require additional neighbors in the event of a communication failure.

More particularly, FIG. 11 depicts an exemplary predictive neighbor analysis routine 500 which may be executed as the predictive neighbor analysis at block 312. Beginning at block 502, the predictive neighbor routine 500 assumes that the failure of the communication ability associated with the connectivity condition has occurred. As mentioned above, this may include, but is not limited to, communication device failure in the event of a low battery condition as shown conceptually in FIG. 7, communication device failure in the event of a pinch point condition as shown conceptually in FIG. 8, and communication path failure in the event of a low stability condition as shown conceptually in FIG. 9.

Again, depending on the connectivity condition that occurred, the predictive neighbor analysis routine 500 either removes the communication path at block 504, or removes the wireless node at block 508. In removing the communication path and/or wireless node, the predictive neighbor analysis routine 500 may effectively simulate the wireless mesh network 70 as if the communication ability has failed in order to predict the effect of the connectivity condition on the wireless nodes individually and the wireless mesh network 70 overall. While described with reference to a simulation of one failure of a communication ability, the predictive neighbor analysis routine 500 may simulate multiple failures as a result of multiple connectivity issues.

As one example, the predictive neighbor analysis routine 500 may simulate the failure of a communication path by temporarily modifying the communication statistics received by the gateway 35 or modifying the results of diagnostics based on communication statistics from the wireless nodes. Examples of such modifications include, but are not limited to, modifying assigned communication routes to remove unstable communication paths, modifying identification of neighbors, received signal strength indicators (RSSI) from neighbors, received signal strength indicators (RSSI) to neighbors, the percentage of successful communications with neighbors, number of parents and children to that particular node, parent-to-children ratio, parent-to-neighbor ratio, and children-to-neighbor ratio may be updated for each of wireless nodes with respect to one another.

In another instance, where a wireless node is removed from the wireless mesh network 70, communication routes assigned by the network manager that involve the removed node may be modified to reroute messages along another communication route that does not involve the removed node. In addition, or in the alternative, identification of neighbors, received signal strength indicators (RSSI) from neighbors, received signal strength indicators (RSSI) to neighbors, the percentage of successful communications with neighbors, number of parents and children to that particular node, parent-to-children ratio, parent-to-neighbor ratio, and children-to-neighbor ratio may be updated for each wireless node that has WD6 as a neighbor such that information on the removed wireless node is not reflected in any of the communication statistics for the wireless mesh network 70.

Figure 12:
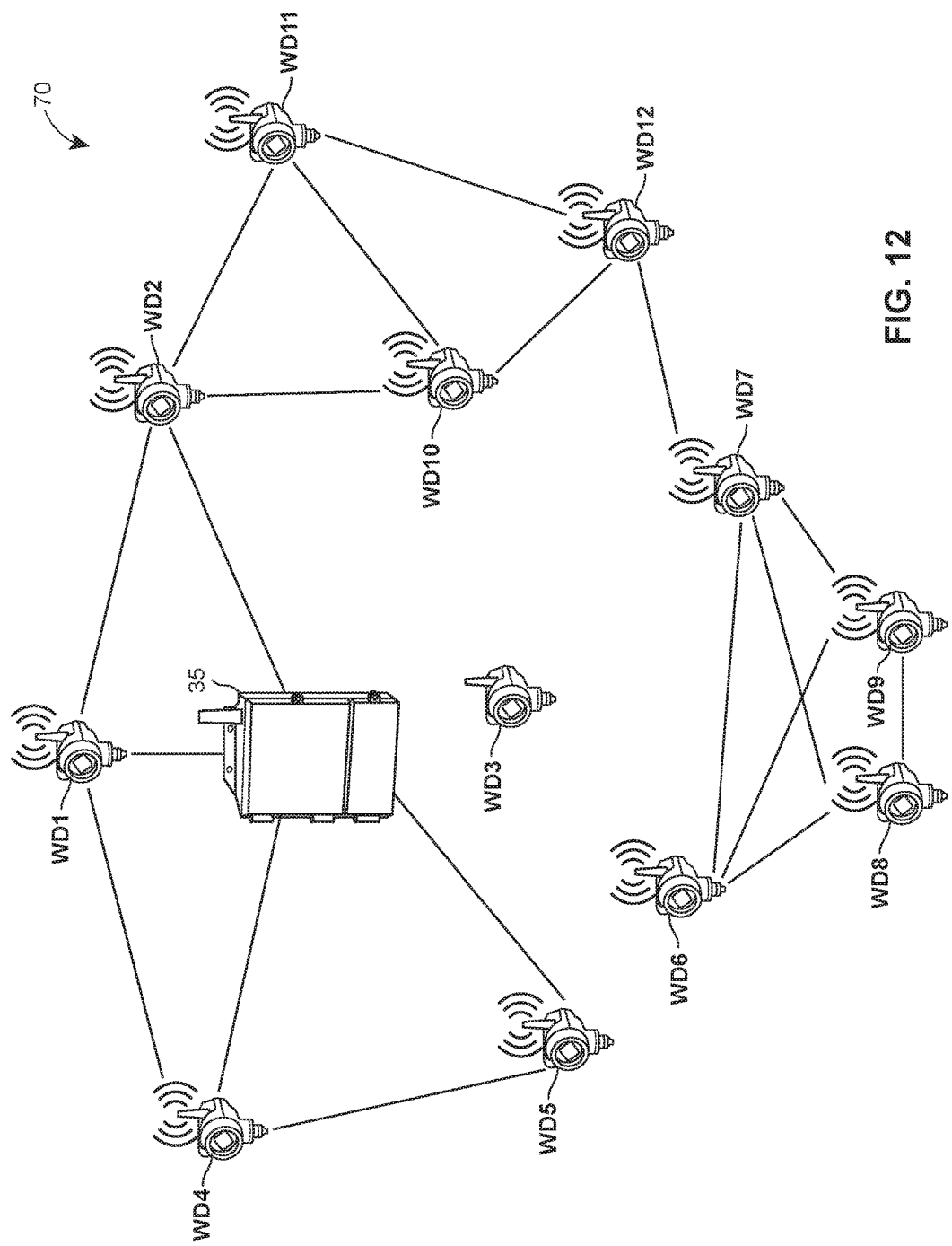
FIG. 12 is a schematic diagram of a wireless communication environment in which the wireless mesh network of FIG. 3 has a predicted communication path failure and a predicted communication device failure in accordance with this disclosure.

FIG. 12 conceptually shows a communication device failure at wireless node WD3 due to a low battery condition, and a communication path failure due to the low stability in the communication path between wireless nodes WD5 and WD6. FIG. 13 shows the updated mesh network topology in tabular form as a result of the communication device and communication path failures, reflecting the assumption that the gateway 35 and wireless nodes WD5, WD6, WD7 and WD10 no longer have WD3 as a neighbor, and that WD5 and WD6 no longer have each other as a neighbor. In analyzing the topology of the wireless mesh network, the predictive neighbor analysis routine 500 determines at blocks 506 and 510 that the communication path failure between WD5 and WD6, and the communication device failure of WD3 results in only four neighbors for the gateway 35, and two neighbors for wireless node WD5. Using the example of the five/three best practice standard, both the gateway 35 and wireless node WD5 are potential pinch points. That is, where best practice is for the gateway 35 to have at least five neighboring nodes, and each of the wireless nodes to have at least three neighboring nodes (i.e., either the gateway 35 and/or neighboring nodes), in order to maintain a robust, self-healing mesh network, the gateway 35 and wireless node WD5 each fall below that threshold. Moreover, the predictive diagnostics routine 300 will identify wireless nodes WD7 and WD12 as potential pinch points using the predictive pinch point routine 400 described above, where a subsequent communication instability between WD7 and WD12 could lead to communication failures of wireless nodes WD6-WD9. Thus, the predictive neighbor analysis routine 500 may determine which, if any, wireless nodes may become a potential pinch point in the event the connectivity condition results in a failure of a communication ability within the wireless mesh communication network 70.

Referring back to FIG. 6, at block 314 the predictive diagnostics routine 300 utilizes the results from the pinch point analysis 308, the predictive pinch point analysis 310 and the predictive neighbor analysis 312 to identify a future state of the wireless mesh network 70 including all predicted or potential pinch points in the wireless mesh network 70, potential communication device failures, potential communication path failures, etc. For example, the predictive diagnostics routine 300 may provide an overview of all the wireless mesh communication networks within the process control network 100, process control system, process plant, industrial setting 10, etc. or any subset thereof on a graphical user interface (GUI), which may be displayed on, for example, a display screen 14 of a workstation 13. For any wireless network having a connectivity condition that may result in a potential or predicted pinch point, or loss of communication, the GUI may graphically highlight the affected network. Using selectable icons, the GUI may respond to a user input selecting the affected network to bring up an overview report of the wireless network listing the field devices associated with the wireless nodes, along with the current status of each and the predicted status of each. Additional information may include the number of neighbors, battery level, communication stability, gateway, etc. for each wireless node. In the alternative, the GUI may generate a display similar to that shown in FIG. 3 that graphically shows the topology of the wireless mesh network, with the connectivity conditions highlighted (e.g., highlighted communication path for instability, highlighted wireless node for low battery level, highlighted wireless node for pinch point, etc.). Each communication path, wireless node and gateway may be graphically represented and selectable, where selecting a highlighted path or wireless node generates a new image of the network topology showing the predicted pinch points, potential pinch points, communication path failures, communication device failures, etc. similar to those shown in FIGS. 7, 8, 9 and 12.

The following additional considerations apply to the foregoing discussion. Throughout this specification, actions described as performed by any device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device). The instructions, when executed by one or more processors of a corresponding device (e.g., a server, a user interface device, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," and like other terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "causing to be presented," "causing to be displayed," "displaying," or the like may refer to actions or processes of a machine (e.g., a computer) that manipulates or transforms data represented as physical (e.g., electronic, magnetic, biological, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

The invention claimed is:

1. A method of predictive wireless connectivity diagnostics for a wireless mesh network providing communication in a process control system, the wireless mesh network including a plurality of wireless nodes organized in a mesh topology, wherein the wireless mesh network has at least one connectivity condition, the connectivity condition being an anticipated failure of a communication ability within the wireless mesh network, the method comprising:
   generating, in response to the connectivity condition, predicted pinch points within the mesh network as a function of the failure of the communication ability within the wireless mesh network and communication paths between each of the plurality of wireless nodes and a gateway of the wireless mesh network, a pinch point being a wireless node whose failure would result in at least one other wireless node no longer having a communication path to the gateway of the wireless mesh network and a predicted pinch point being a wireless node that would become a pinch point upon the failure of the communication ability within the wireless mesh network;
   generating, in response to the connectivity condition, potential pinch points within the wireless mesh network as a function of the failure of the communication ability within the wireless mesh network and a number of neighboring wireless communication devices in direct wireless communication with each of the plurality of wireless nodes, a potential pinch point being a wireless node that has less than a threshold number of neighboring wireless communication devices in direct wireless communication with the wireless node; and
   applying the predicted pinch points and potential pinch points to identify a future state of the wireless mesh network.

2. The method of claim 1, wherein the connectivity condition comprises an anticipated failure of an ability of a wireless node within the wireless mesh network to directly and wirelessly communicate with a neighboring wireless communication device, and wherein the wireless node is a pinch point within the wireless mesh network, the method further comprising:
   generating, in response to the connectivity condition, predicted communication failures of wireless nodes within the mesh network as a function of the failure of the pinch point to directly and wirelessly communicate with the neighboring wireless communication device and communication paths between ones of the plurality of wireless nodes in indirect wireless communication with the gateway via the pinch point, a communication failure comprising a failure in a communication path between a wireless node and the gateway; and
   applying the predicted communication failures to identify a future state of the wireless mesh network.

3. The method of claim 2, wherein the anticipated failure of the ability of the pinch point to directly and wirelessly communicate with the neighboring wireless communication device is caused by a status of a battery in the pinch point, wherein the anticipated failure comprises an anticipated failure of the battery for the pinch point.

4. The method of claim 3, wherein the status of the battery comprises one or more of a depleted electrical storage in the battery and a depleted health of the battery.

5. The method of claim 3, where each of the plurality of wireless nodes corresponds to a field device within the process control system, the wireless node communicatively coupling the field device to the wireless mesh network, and wherein the status of the battery is defined by a threshold, the threshold for each wireless node being dependent upon the criticality of the corresponding field device to the process control system.

6. The method of claim 2, wherein the anticipated failure of the ability of the pinch point to directly and wirelessly communicate with the neighboring wireless communication device is caused by instability in the communication path between the pinch point and the neighboring wireless communication device, and the anticipated failure comprises an anticipated failure of the communication path between the pinch point and the neighboring wireless communication device.

7. The method of claim 1, wherein the anticipated failure of a communication ability within the wireless mesh network is caused by a status of a battery in the wireless node, and the anticipated failure comprises an anticipated failure of the battery for the wireless node.

8. The method of claim 7, wherein the status of the battery comprises one or more of a depleted electrical storage in the battery and a depleted health of the battery.

9. The method of claim 7, where each of the plurality of wireless nodes corresponds to a field device within the process control system, the wireless node communicatively coupling the field device to the wireless mesh network, and wherein the status of the battery is defined by a threshold, the threshold for each wireless node being dependent upon the criticality of the corresponding field device to the process control system.

10. The method of claim 1, wherein the connectivity condition is caused by instability in a direct wireless communication between a wireless node and a neighboring wireless communication device, and the anticipated failure comprises failure of the communication path between the wireless node and the neighboring wireless communication device.

11. The method of claim 1, wherein applying the potential pinch points to identify a future state of the wireless mesh network comprises identifying each potential pinch point as needing an additional neighboring wireless communication device in direct wireless communication with the potential pinch point.

12. The method of claim 11, wherein the threshold number of neighboring wireless communication devices in direct wireless communication with the analyzed wireless node comprises the gateway being in direct wireless communication with at least five wireless nodes, and each wireless node being in direct wireless communication with at least three neighboring wireless communication devices.

13. The method of claim 1, wherein a neighboring wireless communication device is one of the gateway of the wireless mesh network and another wireless node.

14. A method of predictive wireless connectivity diagnostics for a wireless mesh network in a process control system, the wireless mesh network including a plurality of wireless nodes organized in a mesh topology, wherein the wireless mesh network has at least one connectivity condition, the connectivity condition being an anticipated failure of a communication ability within the wireless mesh network, the method comprising:
   simulating, in response to the connectivity condition, the wireless mesh network as if the failure of the communication ability occurred within the wireless mesh network;

analyzing the simulated mesh network for pinch points within the simulated mesh network, a pinch point being a wireless node whose failure would result in at least one other wireless node no longer having a communication path to a gateway of the wireless mesh network;

identifying, in response to the analysis of the simulated mesh network, one or more wireless nodes as predicted pinch points if the failure of the communication ability occurred within the wireless mesh network;

analyzing each wireless node in the simulated mesh network for a number of neighboring wireless communication devices in the simulated wireless mesh network in direct wireless communication with the analyzed wireless node;

identifying, in response to the analysis of each wireless node in the simulated mesh network, one or more wireless nodes as potential pinch points if the failure of the communication ability occurred within the wireless mesh network and the number of neighboring wireless communication devices is below a threshold number of neighboring wireless communication devices; and applying the predicted pinch points and potential pinch points to identify a future state of the wireless mesh network.

15. The method of claim 14, wherein the connectivity condition comprises an anticipated failure of an ability of a wireless node within the wireless mesh network to directly and wirelessly communicate with a neighboring wireless communication device, and wherein the wireless node is a pinch point within the wireless mesh network, the method further comprising:

analyzing the pinch point for neighboring wireless nodes in direct wireless communication with the analyzed pinch point; and identifying, in response to the analysis of the pinch point, wireless nodes in indirect wireless communication with the gateway via only the pinch point.

16. The method of claim 15, wherein simulating the wireless mesh network as if the failure of the communication ability occurred within the wireless mesh network comprises simulating the wireless mesh network without the pinch point.

17. The method of claim 15, further comprising predicting that each identified wireless node in indirect wireless communication with the gateway via only the pinch point will lose communication with the gateway upon failure of the ability of the wireless node to directly and wirelessly communicate with the neighboring wireless communication device.

18. The method of claim 15, wherein the anticipated failure of the ability of the wireless node within the wireless mesh network to directly and wirelessly communicate with the neighboring wireless communication device is caused by a low battery level in the wireless node, and the anticipated failure comprises an anticipated failure of the battery for the wireless node.

19. The method of claim 18, wherein the low battery level comprises one or more of a depleted electrical storage in the battery and a depleted health of the battery.

20. The method of claim 15, wherein the anticipated failure of the ability of the wireless node within the wireless mesh network to directly and wirelessly communicate with the neighboring wireless communication device is caused by instability in the direct wireless communication between the pinch point and the neighboring wireless communication device, and the anticipated failure comprises an anticipated failure of the communication path between the pinch point and the neighboring wireless communication device.

21. The method of claim 14, wherein the connectivity condition is caused by a low battery level in a wireless node, and the anticipated failure comprises an anticipated failure of the battery for the wireless node.

22. The method of claim 21, wherein the low battery level comprises one or more of a depleted electrical storage in the battery and a depleted health of the battery.

23. The method of claim 14, wherein the connectivity condition is caused by instability in a direct wireless communication between a wireless node and a neighboring wireless communication device, and the anticipated failure comprises failure of the direct wireless communication between the wireless node and the neighboring wireless communication device.

24. The method of claim 23, wherein simulating the wireless mesh network as if the failure of the communication ability occurred within the wireless mesh network comprises simulating the wireless mesh network without direct wireless communication between the wireless node and the neighboring wireless communication device.

25. The method of claim 14, wherein identifying one or more wireless nodes as potential pinch points comprises identifying the potential pinch point as needing an additional neighboring wireless communication device in direct wireless communication with the potential pinch point.

26. The method of claim 25, wherein the threshold number of neighboring wireless communication devices in the simulated wireless mesh network in direct wireless communication with the analyzed wireless node comprises the gateway in the simulated wireless mesh network being in direct wireless communication with at least five wireless nodes, and each wireless node in the simulated wireless mesh network being in direct wireless communication with at least three neighboring wireless communication devices.

27. The method of claim 14, wherein a neighboring wireless communication device is one of the gateway of the wireless mesh network and another wireless node.

28. A wireless mesh network comprising:

a gateway;

a plurality of wireless nodes communicatively coupled to the gateway, each adapted to transmit wireless node condition data to the wireless gateway;

a network manager communicatively coupled to the gateway and adapted to:

schedule communication among the wireless nodes and the gateway, define communication paths between the gateway and the wireless nodes, and identify connectivity conditions within the mesh network as a function of the wireless node condition data from the plurality of wireless nodes, a connectivity condition being an anticipated failure of a communication ability within the wireless mesh network, predict pinch points within the mesh network as a function of the failure of the communication ability within the wireless mesh network and the communication paths, a pinch point being a wireless node whose failure would result in at least one other wireless node no longer having a communication path to the gateway of the wireless mesh network and a predicted pinch point being a wireless node that would become a pinch point upon the failure of the communication ability within the wireless mesh network, and predict potential pinch points within the wireless mesh network as a function of the failure of the communication ability within the wireless mesh network and neighboring wireless communication devices in direct wireless communication with each of the plurality of wireless nodes, a potential pinch point being a wireless node that has less than a threshold number of neighboring wireless communication devices in direct wireless communication with the wireless node.

29. The wireless mesh network of claim 28, wherein the connectivity condition comprises an anticipated failure of an ability of a wireless node within the wireless mesh network to directly and wirelessly communicate with a neighboring wireless communication device, and wherein the wireless node is a pinch point within the wireless mesh network, the network manager further adapted to:

predict communication failures of wireless nodes within the mesh network as a function of the failure of the pinch point to directly and wirelessly communicate with the neighboring wireless communication device and the communication paths, a communication failure comprising a failure in a communication path between a wireless node and the gateway in indirect wireless communication with the gateway via the pinch point.

30. The wireless mesh network of claim 29, wherein the anticipated failure of the ability of the pinch point to directly and wirelessly communicate with the neighboring wireless communication device is caused by a status of a battery in the pinch point, wherein the anticipated failure comprises an anticipated failure of the battery for the pinch point.

31. The wireless mesh network of claim 30, wherein the status of the battery comprises one or more of a depleted electrical storage in the battery and a depleted health of the battery.

32. The wireless mesh network of claim 30, where each of the plurality of wireless nodes corresponds to a field device within the process control system, the wireless node communicatively coupling the field device to the wireless mesh network, and wherein the status of the battery is defined by a threshold, the threshold for each wireless node being dependent upon the criticality of the corresponding field device to the process control system.

33. The wireless mesh network of claim 29, wherein the anticipated failure of the ability of the pinch point to directly and wirelessly communicate with the neighboring wireless communication device is caused by instability in the communication path between the pinch point and the neighboring wireless communication device, and the anticipated failure comprises an anticipated failure of the communication path between the pinch point and the neighboring wireless communication device.

34. The wireless mesh network of claim 28, wherein the connectivity condition is caused by a status of a battery in the wireless node, and the anticipated failure comprises an anticipated failure of the battery for the wireless node.

35. The wireless mesh network of claim 34, wherein the status of the battery comprises one or more of a depleted electrical storage in the battery and a depleted health of the battery.

36. The wireless mesh network of claim 34, where each of the plurality of wireless nodes corresponds to a field device within the process control system, the wireless node communicatively coupling the field device to the wireless mesh network, and wherein the status of the battery is defined by a threshold, the threshold for each wireless node being dependent upon the criticality of the corresponding field device to the process control system.

37. The wireless mesh network of claim 28, wherein the connectivity condition is caused by instability in a direct wireless communication between a wireless node and a neighboring wireless communication device, and the anticipated failure comprises failure of the communication path between the wireless node and the neighboring wireless communication device.

38. The wireless mesh network of claim 28, wherein the network manager is further adapted to identify each potential pinch point as needing an additional neighboring wireless communication device in direct wireless communication with the potential pinch point.

39. The wireless mesh network of claim 38, wherein the threshold number of neighboring wireless communication devices in direct wireless communication with the analyzed wireless node comprises the gateway being in direct wireless communication with at least five wireless nodes, and each wireless node being in direct wireless communication with at least three neighboring wireless communication devices.

40. The wireless mesh network of claim 28, wherein a neighboring wireless communication device is one of the gateway of the wireless mesh network and another wireless node.

41. The wireless mesh network of claim 28, wherein the wireless node condition data from each wireless node comprises one or more of battery condition data for the wireless node, identification of a neighboring wireless communication device in direct wireless communication with the wireless node, received signal strength from a neighboring wireless communication device and percentage of successful communications between the wireless node and the neighboring wireless communication device.

* * * * *